(12) United States Patent
Li et al.

(10) Patent No.: US 11,178,413 B1
(45) Date of Patent: Nov. 16, 2021

(54) DYNAMICALLY TRANSITIONING A DIGITAL VIDEO FILE BETWEEN ENCODING STATES

(71) Applicant: Facebook, Inc., Menlo Park, CA (US)

(72) Inventors: Ang Li, Union City, CA (US); Lukas Camra, San Francisco, CA (US); Runshen Zhu, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/930,018

(22) Filed: Jul. 15, 2020

(51) Int. Cl.
*H04N 19/30* (2014.01)
*H04N 19/103* (2014.01)

(52) U.S. Cl.
CPC .......... *H04N 19/30* (2014.11); *H04N 19/103* (2014.11)

(58) Field of Classification Search
CPC .............................. H04N 19/30; H04N 19/103
See application file for complete search history.

(56) References Cited

U.S. PATENT DOCUMENTS

| 10,681,398 | B1* | 6/2020 | Marcin | H04N 21/845 |
| 2014/0137144 | A1* | 5/2014 | Jarvenpaa | H04N 21/6582 725/13 |
| 2018/0285933 | A1* | 10/2018 | Lee-Chan | G06Q 30/0269 |
| 2019/0200079 | A1* | 6/2019 | Mathur | H04N 21/25891 |

* cited by examiner

*Primary Examiner* — Tat C Chio
(74) *Attorney, Agent, or Firm* — Keller Jolley Preece

(57) ABSTRACT

The present disclosure relates to systems, non-transitory computer-readable media, and methods for dynamically transitioning a digital video file between encoding states of video data encodings. For example, upon receiving an uploaded digital video file, the disclosed systems can generate an initial set of video data encodings for the digital video file in an initial state. The disclosed systems further determine a virality score associated with the digital video file. Based on the virality score, the disclosed systems determine the virality score satisfies a threshold for transitioning the digital video file from the initial state to the upgraded state and generate premium encodings for the digital video file. Similarly, based on an updated virality score or a time-based trigger, the disclosed systems can transition the digital video file from the upgraded state (or the initial state) to the maintenance state by purging one or more video data encodings.

20 Claims, 12 Drawing Sheets

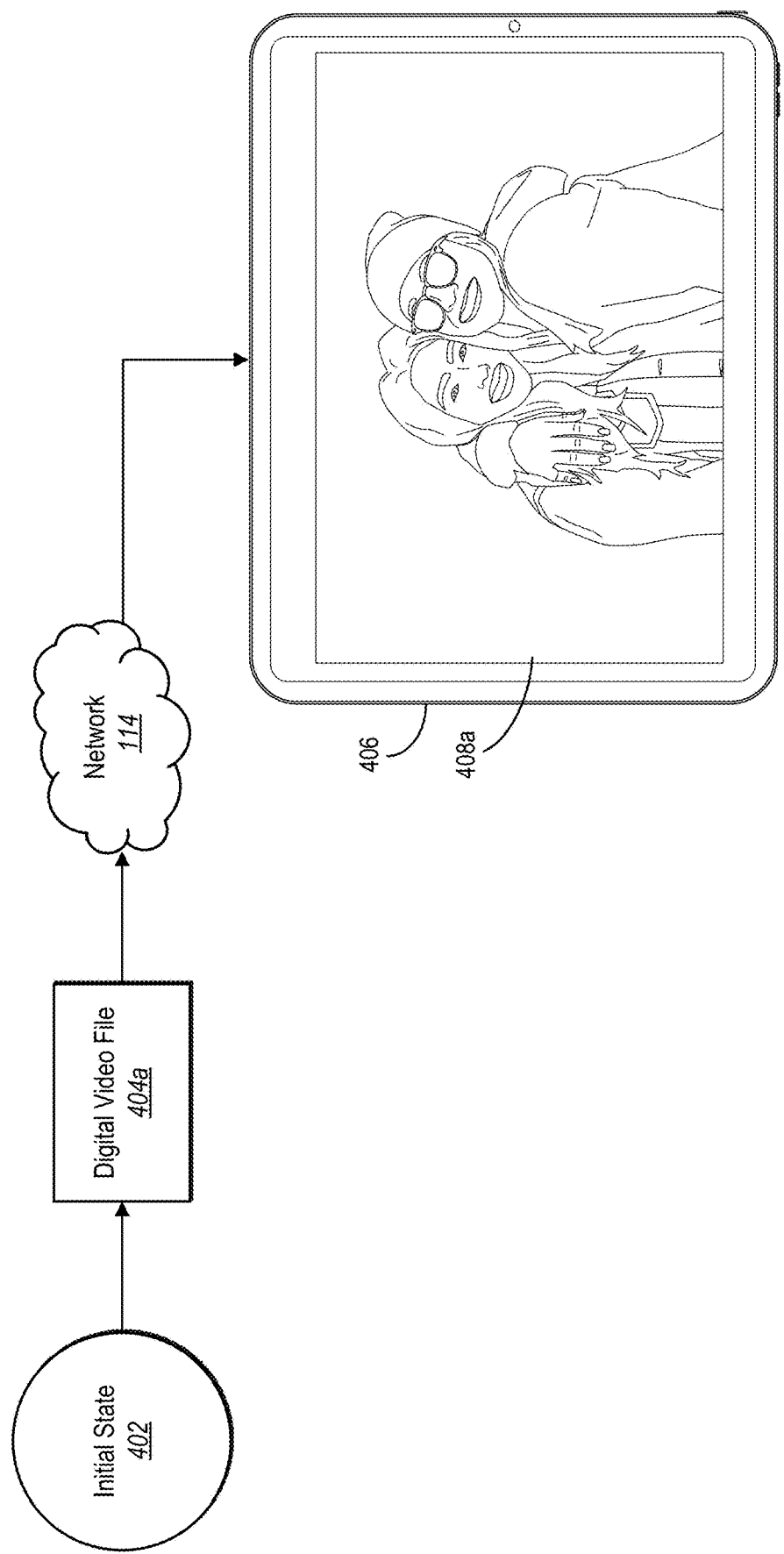

DYNAMICALLY TRANSITIONING A DIGITAL VIDEO FILE BETWEEN ENCODING STATES

BACKGROUND

In recent years, digital-content-sharing systems have improved the speed and ease with which users share digital content across or between computing devices, such as when sharing digital images or digital videos. Such advancements have occurred as a result of many factors. For example, conventional digital-content-sharing systems can generate data encodings that are compatible with sharing content among a wide range of computing devices and network connectivity. In some cases, conventional systems can also generate data encodings for sharing higher quality digital content with a smaller range of more sophisticated computing devices or increased levels of network connectivity. As data encodings have become more complex, conventional systems have consumed more computing resources to generate data encodings, increased storage capacity to store data encodings, and decreased the flexibility with which computing devices share data encodings of differing quality.

For example, conventional digital-content-sharing systems often use a relatively high amount of computer processing (or other computing resources) to generate some video encodings. Some video encodings for higher quality digital content may require greater amounts of computer resources than video encodings for lesser quality digital content. To provide the best quality of digital content, some conventional systems may expend vast amounts of computer resources to generate a wide range of video encodings, including premium (high quality) video encodings that are computationally expensive, such as AOMedia Video ("AV") 1 or Video Predictor ("VP") 9. When digital-content-sharing systems receive millions to hundreds of millions of digital content uploads per day, conventional systems expend a significant amount of processing and other computing resource to the point of unsustainable upload speeds that (in some cases) can cause a system to crash or schedule downtime.

In addition to the computational expense for generating some video encodings, conventional digital-content-sharing systems can also consume inordinate storage capacity to store higher quality video encodings. By generating only premium (high quality) video encodings that require more storage space, for instance, some conventional systems can use vast amounts of computer storage. When compounded with millions to hundreds of millions of digital-content uploads per day, some conventional system quickly deplete storage capacity and frequently add additional memory or other storage to store ever increasing data for uploaded images or videos.

In addition to straining computing resources, some conventional digital-content-sharing systems apply rigid algorithms for generating or storing video encodings and subsequently transmitting corresponding digital content on demand. For example, some conventional systems generate video encodings exclusively or predominantly for lower quality digital content or higher quality digital content. The rigid approach of some conventional systems can create other technical problems. For instance, generating video encodings mostly for lower quality digital content can lead to poor viewing ability on some devices, particularly on more sophisticated client devices designed for high quality (e.g., high resolution) digital content. On the other hand, generating video encodings mostly for higher quality digital content can render some devices and network speeds incompatible with the digital content.

BRIEF SUMMARY

This disclosure describes one or more embodiments of methods, non-transitory computer-readable media, and systems that solve one or more of the foregoing problems or provide other benefits. For instance, the disclosed systems can identify a digital video file upon upload and dynamically transition the digital video file between encoding states of video data encodings. In particular, the disclosed systems can encode a digital video file (and transition between) an initial state, an upgraded state, and a maintenance state. Each state corresponds to specific sets of video data encodings of varying quality. As the digital video file is stored for a threshold time or is increasingly viewed (or shared) by users with an increase in virality, the disclosed systems can dynamically transition a digital video file from state to state in various ways.

For example, upon receiving an uploaded digital video file, the disclosed systems generate an initial set of video data encodings for the digital video file in an initial state. The disclosed systems further determine a virality score associated with the digital video file based on actions by other users of the social networking system with respect to an uploading user or the digital video file. Based on the virality score, the disclosed systems determine the virality score satisfies a threshold for transitioning the digital video file from the initial state to the upgraded state and further generate premium encodings for the digital video file. Similarly, based on an updated virality score or a time-based trigger, the disclosed systems can transition the digital video file from the upgraded state to the maintenance state by purging one or more video data encodings (e.g., the premium encodings). Additionally or alternatively, the disclosed systems may likewise use a virality score or a time-based trigger to transition the digital video file from the initial state to the maintenance state.

BRIEF DESCRIPTION OF THE DRAWINGS

The detailed description provides one or more embodiments with additional specificity and detail through the use of the accompanying drawings, as briefly described below.

FIGS. 4A-4C illustrate a video-data-encoding system transmitting digital video files of varying video data encodings for display on a client device in accordance with one or more embodiments.

DETAILED DESCRIPTION

Figure 1:
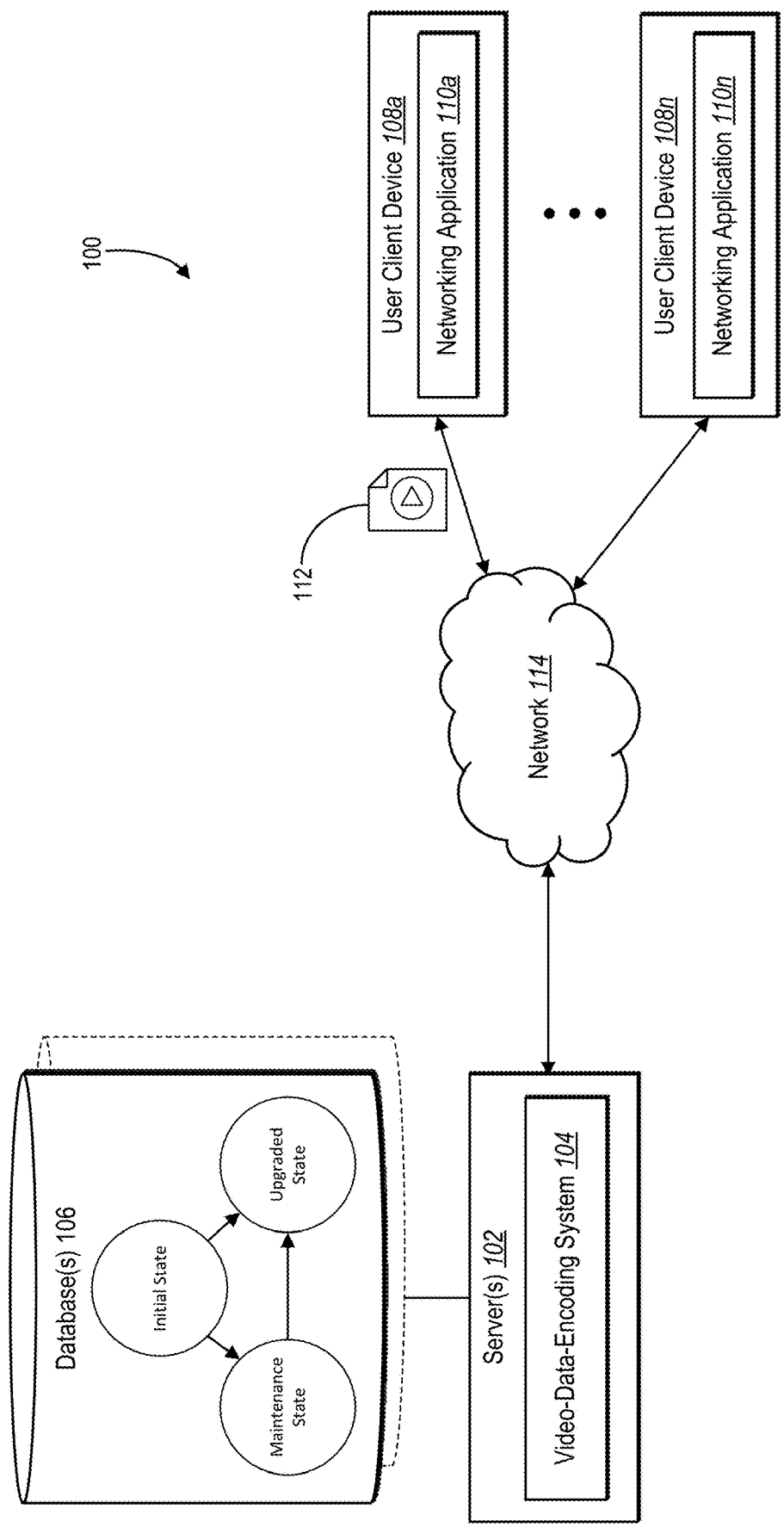
FIG. 1 illustrates a diagram of a computing system environment in which a video-data-encoding system operates in accordance with one or more embodiments.

This disclosure describes one or more embodiments of a video-data-encoding system that can identify a digital video file upon upload and dynamically transition the digital video file between encoding states of video data encodings based on actions of social networking users with respect to an uploading user of the video file or the video file. For example, based on receiving an uploaded digital video file from a device of an uploading user, the video-data-encoding system can encode the digital video file in an initial state by generating an initial set of video data encodings for the digital video file. In turn, the video-data-encoding system can generate a virality score representing a number of users subscribed to receive digital content from the uploading user, a number of views of the digital video file, or a predicted watchtime of the digital video file. Based on satisfying a transition threshold, the video-data-encoding system can transition the digital video file to an upgraded state by generating an upgraded set of video data encodings.

By contrast, if the virality score for the digital video file fails to satisfy the transition threshold, the video-data-encoding system can transition the digital video file from the initial state to a maintenance state by removing some of the initial set of video data encodings. In either case, the video-data-encoding system can determine whether a virality score satisfies the transition threshold within a threshold time period before transitioning between encoding states. In some embodiments, the video-data-encoding system can also transition (e.g., bi-directionally) between the maintenance state and the upgraded state based on one or both of periodic virality-score checks and expiration of threshold time periods.

As mentioned above, the video-data-encoding system can receive a digital video file upon upload and generate an initial set of video data encodings. For example, in response to one or more user inputs at a graphical user interface of a computing device associated with an uploading user, the video-data-encoding system can receive data representing a digital video file to be uploaded to a social networking system. Based on the data representing the digital video file, the video-data-encoding system can generate one or more encodings for the digital video file in the initial state. By generating the initial set of video data encodings for the digital video file, such as a basic encoding or a commonly compatible encoding, the video-data-encoding system can transmit the digital video file for playback on a large variety of requesting client devices. In addition to the initial set of encodings for the digital video file, the video-data-encoding system can automatically upon upload or later upon satisfying a transition threshold generate additional video data encodings (e.g., premium encodings) for the digital video file in an upgraded state.

In addition to generating a set of initial video data encodings, the video-data-encoding system can generate a virality score. In one or more embodiments, the virality score can include a priority ranking for the digital video file based on a number of users of the social networking system subscribed to receive digital content from the uploading user. Additionally or alternatively, in some embodiments, the virality score can reflect a number of views of the digital video file by users of the social networking system. Further, in some embodiments, the virality score can reflect a predicted or actual watchtime by users of the social networking system of the digital video file.

Based on the virality score, the video-data-encoding system can determine whether to transition the digital video file to an upgraded state or a maintenance state. For the upgraded state, the video-data-encoding system generates a set of upgraded video data encodings. With the upgraded video data encodings, the video-data-encoding system can transmit higher quality versions of the digital video file for enhanced playback on more sophisticated (e.g., higher-end) client devices. To that end, the video-data-encoding system can determine to transition the digital video file to the upgraded state based on a comparison of a priority ranking for the digital video file and a dynamic transition threshold reflecting available computing resources. Similarly, based on a comparison of the number of views for the digital video file and a threshold view count, the video-data-encoding system can determine to transition the digital video file to the upgraded state. Additionally or alternatively, based on a comparison of a predicted watchtime for the digital video file and threshold predicted watchtime, the video-data-encoding system can determine to transition the digital video file to the upgraded state.

As indicated above, the video-data-encoding system can also transition a digital video file from an initial state to a maintenance state. If a virality score for the digital video file fails to satisfy the transition threshold within a threshold period of time, for instance, the video-data-encoding system can determine not to transition the digital video file to the upgraded state. Rather, the video-data-encoding system can transition the digital video file from the initial state to a maintenance state by removing some of the initial set of video data encodings.

After transitioning the digital video file to either the maintenance state or the upgraded state, in some embodiments, the video-data-encoding system can further transition the digital video file to one or more states. As an example, while a digital video file is in the maintenance state, the video-data-encoding system may determine that the digital video file has gone viral (at an initial or subsequent time) based on an updated virality score. Based on the updated virality score, the video-data-encoding system can transition the digital video file from the maintenance state to the upgraded state and generate a corresponding set of upgraded video data encodings. In some embodiments, such a transition from the maintenance state to the upgraded state may be a phased transition (e.g., to different tiers of the upgraded state). In some such cases, the video-data-encoding system may generate a first set of upgraded video data encodings, and then later on, a second set of additional upgraded video data encodings.

As another example, while a digital video file is in the upgraded state, the video-data-encoding system may determine that the digital video file has gone "cold" or has faded in virality (at a subsequent time) based on one or both of an updated virality score and expiration of a threshold period of time. In response, the video-data-encoding system may transition the digital video file from the upgraded state to the maintenance state by removing (e.g., in phases) one or more encodings associated with the upgraded state, including premium encodings. Thus, in some embodiments, the videodata-encoding system can dynamically transition a digital video file back-and-forth between the upgraded state and the maintenance state.

As mentioned above, the video-data-encoding system provides several technical advantages over conventional digital-content-sharing systems by more efficiently using computing resources or more flexibly generating encodings for digital video files. For example, the video-data-encoding system can conserve computing resources used to generate video data encodings by selectively generating premium encodings for those digital video files transitioned to an upgraded state or selectively removing encodings from those digital video files transitioned to a maintenance state. In some cases, the video-data-encoding system intelligently generates video data encodings utilizing more computational processing for a digital video file upon determining that a user account uploading the file has a volume of subscribers above a transition threshold or determining the file amassed sufficient views or is predicted to generate sufficient watchtime above a dynamic transition threshold.

By contrast, the video-data-encoding system conserves processing power by not generating such video data encodings for digital video files falling below one or more transition thresholds. By generating fewer video data encodings and reserving computationally expensive encodings for more viral (or likely viral) digital video files, the video-data-encoding system frees up system bandwidth and processing power to execute other tasks, such as more quickly generating corresponding video data encodings and/or reducing system congestion or downtime.

Similarly, the video-data-encoding system can more efficiently use computer storage resources to store video data encodings than conventional digital-content-sharing systems. By selectively generating upgraded video data encodings that consume more memory for digital video files that satisfy a transition threshold—or selectively removing video data encodings for digital video files that do not satisfy a transition threshold—the video-data-encoding system can efficiently use memory or storage for viral digital video files and otherwise free up system storage space. By also removing some video data encodings when subscribers, views, or watchtime decreases, the video-data-encoding system can efficiently adjust data encodings based on virality. With additional storage space, the video-data-encoding system can receive more digital video files, store more video data encodings, or reduce a storage footprint (e.g., an electricity/energy footprint) to operate storage servers or database structures of the video-data-encoding system.

Further, the video-data-encoding system can flexibly generate, store, or transmit video data encodings by transitioning a digital video file from state to state. Specifically, the video-data-encoding system avoids the rigid approach of some conventional digital-content-sharing systems that exclusively or predominantly generate low quality video data encodings or high quality encodings. Moreover, such rigid approaches fail to flexibly move with the unique life-cycle of a digital video file. For example, by selectively generating upgraded or premium encodings for those digital video files transitioned to an upgraded state, the video-data-encoding system can flexibly accommodate digital video files that are (or will likely be) more viral among users in a social networking system. The video-data-encoding system also dynamically accommodates encodings for digital video files (e.g., "late bloomers" or delayed virality) that, although not previously viral, go viral (or go viral again) at some point in time. For example, the video-data-encoding system can transition such digital video files to an upgraded state with corresponding upgraded video data encodings after the files satisfy transition thresholds at a periodic checkpoint. Similarly, the video-data-encoding system can transition older digital video files that decrease in virality after a threshold time from an upgraded state to a maintenance state.

As illustrated by the foregoing discussion, the present disclosure utilizes a variety of terms to describe features and advantages of the permissions-based distribution system. Additional detail is now provided regarding the meaning of such terms. For example, as used herein, the term "digital video file" refers to a variety of digital file types including a series (or a sequence) of images. In particular, a digital video file can include a series of digital frames as part of a video, movie clip, animation, etc. Such a digital video file can be uploaded by an uploading user device to a social networking system and/or viewed or played by a requesting user device in the social networking system. In some embodiments, the digital video file can include raw video data that is uncompressed (e.g., as included within a camera, computing device, or digital editing system). In other embodiments, the digital video file can include video data pre-compressed in accordance with a specific codec (e.g., compression/decompression algorithms) and a corresponding container (e.g., a video format for storing codecs, metadata) as generated by a computing device when recording, storing, or uploading the digital video file. In addition, the digital video file can include various attributes that the video-data-encoding system can utilize, such as frame size, data rate (or bit rate), audio data rate, and the like.

As also used herein, the term "video data encoding" refers to video data converted into or generated into a particular coded format. In some cases, a video data encoding includes compressing video data according to a compression algorithm. In particular, a video data encoding can include an encoded or a compressed version of the digital video file for storing in various computer resource states and transmitting to requesting client devices for playback. Examples of video data encodings can include loss-less encodings (e.g., H.265, Motion JPEG 2000), low-loss encodings (e.g., MPEG-4 Parts 7 or 8), commonly compatible encodings (e.g., H.264), basic dynamic adaptive streaming over HTTP ("DASH") encodings, full DASH encodings, premium encodings. Moreover, although the description below may mention specific video data encodings that can be utilized for each of the foregoing types of video data encodings, these specific video data encodings as implemented may change with time as understood by those of ordinary skill in the art. For example, a premium encoding comprising VP9 or AV1 video encodings may at some point become commonly compatible encodings as client devices, network connections, and/or encoding standards advance with time.

In addition, as used herein, the term "state" refers to an encoding or encoded state of a digital video file. In some cases, a state may correspond to a type of storage for a digital video file. As examples, a state may include an initial state, an upgraded state, or a maintenance state. As used herein, the term "initial state" refers to an encoding state for digital video files comprising an initial set of video data encodings. In some cases, an initial state includes an encoding state for a digital video file that has been recently uploaded within some predetermined timeframe.

As further used herein, the term "upgraded state" refers to an encoding state for digital video files comprising an upgraded set of video data encodings. In some embodiments, an upgraded state includes a digital video file corresponding to a virality score that meets or exceed a transition threshold, whether upon upload or sometime thereafter.

As additionally used herein, the term "maintenance state" refers to an encoding state for digital video files comprising a downgraded or reduced set of video data encodings. In certain implementations, a maintenance state includes an encoding state for a digital file that transitioned from an initial state or an upgraded state to a maintenance state in response to (i) expiration of a threshold time period or (ii) a virality score failing to satisfy a transition threshold.

Relatedly, the term "threshold time period" refers to a configurable or predetermined duration of time at or after which (i) one more video data encodings are removing from a digital video file, (ii) a digital video file is transitioned to a new encoding state, or (iii) a new virality score is determined for a digital video file. A threshold time period may include various time frames, including, but not limited to, thirty minutes, one hour, twelve hours, thirty days, or ninety days.

Further, as used herein, the term "virality score" refers to a scoring metric indicating a popularity or virality in terms of volume of subscribers, viewers, or view time for a digital video file or a corresponding user. In particular, a virality score can include a scoring metric indicating a popularity or virality of a digital video file based on actions by other users of a social networking system in relation to an uploading user or the digital video file. For example, a virality score may include a priority ranking, such as a ranking metric that ranks an uploading user in relation to other uploading users based on a number of users of the social networking system subscribed to receive content from the uploading user. Thus, the video-data-encoding system can determine a higher priority ranking for a digital video file associated with an uploading user with 500 million followers than another digital video file associated with another uploading user with 500 followers. As another example, a virality score may indicate a number of views of a digital video file, such as a view count indicating a number of times a digital video file has been viewed by users of the social networking system. In yet another example, a virality score may include predicted watchtime, such as a predicted duration of time users of a social networking system will watch a digital video file, a predicted view count, a predicted download count, etc.

As used herein, the term "transition threshold" refers to a score, ranking, or other metric as a point of reference upon which the video-data-encoding system determines whether to transition a digital video file between states. In particular, a transition threshold can include a comparison value for comparing with a virality score associated with a digital video file. As an example, a transition threshold may include a dynamic transition threshold that changes based on available computing resources (e.g., processing power, memory, storage). Thus, the term "available computing resources" refers to (i) usage in terms of time, electricity, or cost, (ii) a computational efficiency in terms of processing (e.g., a measurement of MHz or GHz over time) and/or (iii) a system bandwidth/storage consumption in megabytes, gigabytes, terabytes, petabytes.

As another example of a transition threshold, the transition threshold can include a threshold view count, such as a view count indicating a number of times a digital video file that must be viewed by users of the social networking system before the video-data-encoding system can transition the digital video file from one state to another state. In yet another example, a transition threshold can include a threshold predicted watchtime, such as a predicted duration of time users of a social networking system will watch a digital video file, a predicted view count, a predicted download count, etc. In some cases, the video-data-encoding system uses such a threshold predicted watchtime as a basis for determining whether to transition the digital video file from one state to another state.

Additional detail will now be provided regarding the video-data-encoding system in relation to illustrative figures portraying example embodiments and implementations of the video-data-encoding system. For example, FIG. 1 illustrates a computing system environment (or "environment") 100 for implementing a video-data-encoding system 104 in accordance with one or more embodiments. As shown in FIG. 1, the environment 100 includes server(s) 102, database(s) 106, client devices 108a-108n, a digital video file 112, and a network 114. Each of the components of the environment 100 can communicate via the network 114, and the network 114 may be any suitable network over which computing devices can communicate. Example networks are discussed in more detail below in relation to FIG. 7.

As shown in FIG. 1, the environment 100 includes the database(s) 106. The video-data-encoding system 104 can store video data encodings in the database(s) 106. For example, the video-data-encoding system 104 can store in the database(s) 106 video data encodings of digital video files in an initial state, an upgraded state, and/or a maintenance state. Although FIG. 1 depicts a single database (in solid line) capable of storing video data encodings in various states, the database(s) 106 can include multiple databases, as indicated by the database shown in dashed lines.

For example, in some embodiments, the video-data-encoding system 104 can store video data encodings of the digital video file 112 in the initial state in a first database. In response to transitioning the digital video file 112 from the initial state to an upgraded state, for instance, the video-data-encoding system 104 may transfer video data encodings from the first database and to a second database associated with digital video files in the upgraded state. In addition, for the upgraded state, the video-data-encoding system 104 may generate an upgraded set of video data encodings as described more below. Similarly, in response to transitioning the digital video file 112 from the upgraded state to a maintenance state (or from an initial state to the maintenance state), the video-data-encoding system 104 may transfer video data encodings to a third database associated with digital video files in the maintenance state. In addition, for the maintenance state, the video-data-encoding system 104 may purge one or more video data encodings from the database(s) 106 as described more below.

As further shown in FIG. 1, the environment 100 includes the client devices 108a-108n. The client devices 108a-108n can be one of a variety of computing devices, including a smartphone, tablet, smart television, desktop computer, laptop computer, virtual reality device, augmented reality device, or other computing device as described in relation to FIG. 7. Although FIG. 1 illustrates multiple client devices 108a-108n, in some embodiments, the environment 100 can include a single client device (e.g., the client device 108a). The client devices 108a-108n can further communicate with the server(s) 102 via the network 114. For example, the client devices 108a-108n can receive user input, transmit data to the server(s) 102, and/or receive data from the server(s) 102. For example, the client device 108a can receive user input for uploading the digital video file 112 to the video-data-encoding system 104 via the network 114.

In addition, the client devices 108a-108n include corresponding client applications 110a-110n. In particular, the client applications 110a-110n may be web applications, native applications installed on the client devices 108a-108n (e.g., a mobile application, a desktop application), or cloud-based applications where part of the functionality is performed by the server(s) 102. The client applications 110a-110n can present or display information to a user associated with the client devices 108a-108n, including information for uploading a digital video file, viewing a digital video file, etc. In addition, users can interact with the client applications 110a-110n to provide user input to, for example, record a digital video file, edit a digital video file, share a digital video file, and the like.

As illustrated in FIG. 1, the environment 100 includes the server(s) 102. The server(s) 102 may learn, generate, store, receive, and transmit electronic data, such as executable instructions for generating video data encodings of the digital video file 112 and/or transitioning the digital video file 112 from one state to another state. For example, the server(s) 102 may receive data from the client device 108a based on user input to upload the digital video file 112. In turn, the server(s) 102 can generate an initial set of video data encodings for the initial state. In addition, the video-data-encoding system 104 can transmit the initial set of video data encodings to the database(s) 106 for storage. Additionally or alternatively, the video-data-encoding system 104 can transmit the initial set of video data encodings (or other sets of video data encodings corresponding to an upgraded/maintenance state) to one or more of the client devices 108a-108n (e.g., the client device 108n) requesting playback of the digital video file 112. Further, the video-data-encoding system 104 can generate a virality score for the digital video file 112. Based on the virality score for the digital video file 112, the video-data-encoding system 104 can generate additional encodings (e.g., an upgraded set of video data encodings) for the digital video file 112 to transition the digital video file 112 to an upgraded state. Similarly, based on the virality score or an expiration of a threshold time period, the video-data-encoding system 104 can remove one or more video data encodings to transition the digital video file 112 to a maintenance state.

In these or other embodiments, the server(s) 102 can communicate with the client devices 108a-108n and the database(s) 106 to transmit and/or receive data via the network 114. In some embodiments, the server(s) 102 comprises a content server and/or a data collection server. The server(s) 102 can also comprise an application server, a communication server, a web-hosting server, a social networking server, or a digital content management server.

Although FIG. 1 depicts the video-data-encoding system 104 located on the server(s) 102, in some embodiments, the video-data-encoding system 104 may be implemented by on one or more other components of the environment 100 (e.g., by being located entirely or in part at one or more of the other components). For example, video-data-encoding system 104 may be implemented by one or more of the client devices 108a-108n and/or a third-party device.

In some embodiments, though not illustrated in FIG. 1, the environment 100 may have a different arrangement of components and/or may have a different number or set of components altogether. For example, the environment 100 may include a third-party server (e.g., for storing video data encodings). As another example, the client devices 108a-108n may communicate directly with the video-data-encoding system 104, bypassing the network 114.

Figure 2:
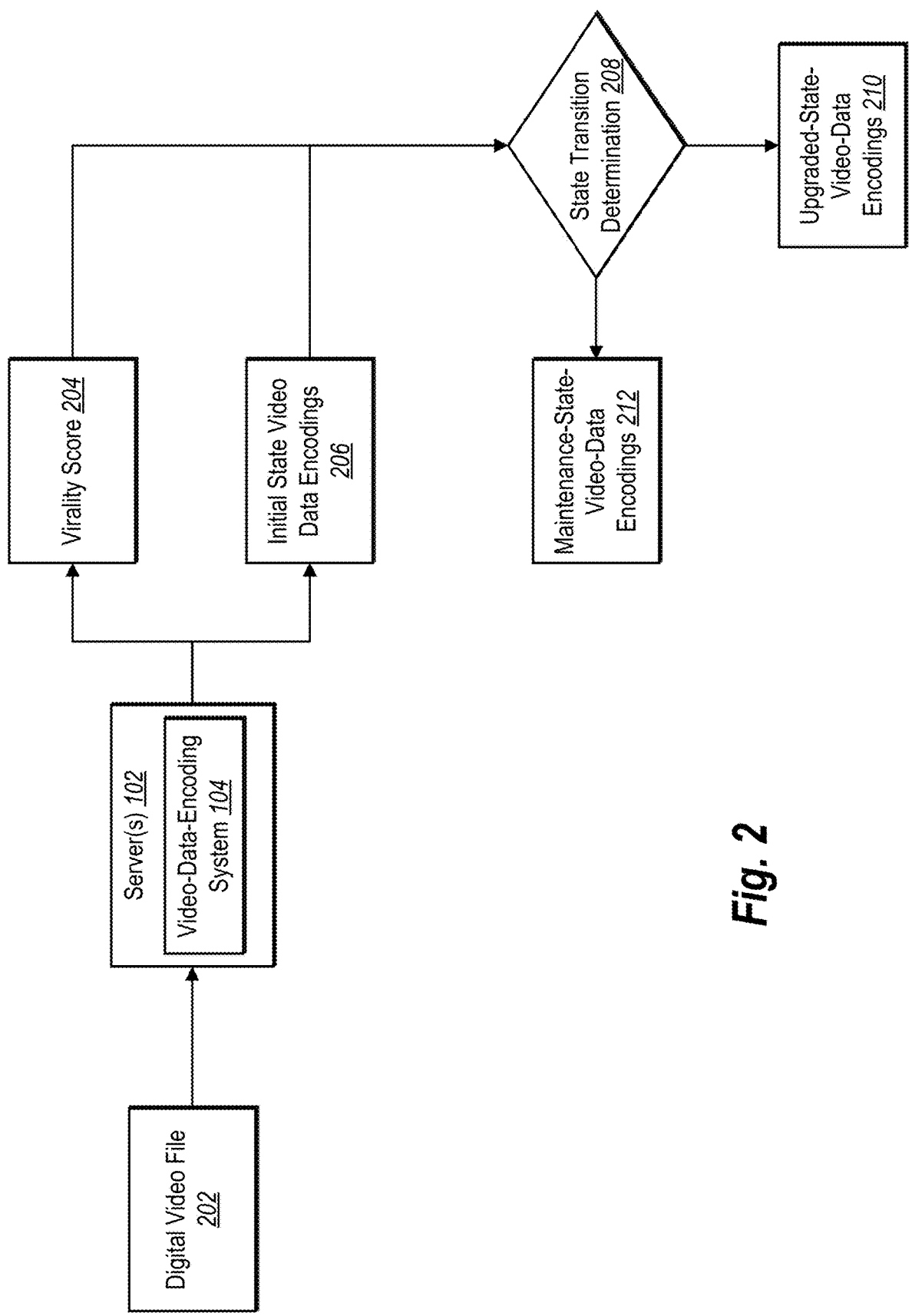
FIG. 2 illustrates a video-data-encoding system identifying a digital video file upon upload and transitioning the digital video file between encoding states of video data encodings in accordance with one or more embodiments.

As mentioned above, the video-data-encoding system 104 can receive a digital video file for uploading to a social networking system, generate a corresponding virality score and initial set of video data encodings, and determine how to transition the digital video file to a next state. In accordance with one or more embodiments, FIG. 2 illustrates the video-data-encoding system 104 identifying a digital video file upon upload and transitioning the digital video file between encoding states of video data encodings. As shown in FIG. 2, for example, the video-data-encoding system 104 identifies a digital video file 202 and generates a virality score 204 associated with the digital video file 202 as a basis for determining whether to transition the digital video file 202 to an alternative encoding state. The video-data-encoding system further performs an act 208 to determine a next state of the digital video file 202 based on the virality score 204. In response to the determination at the act 208, the video-data-encoding system 104 can transition the digital video file 202 to either an upgraded state with upgraded-state-video-data encodings 210 or a maintenance state with maintenance-state-video-data encodings 212.

In particular, the video-data-encoding system 104 can receive the digital video file 202 from a client device associated with an uploading user. For example, the digital video file 202 may be part of an upload request to post the digital video file 202 to a social networking system. In response to receiving the digital video file 202 for posting to the social networking system, the video-data-encoding system 104 can generate a set of initial state video data encodings 206. For example, as described more below in relation to FIG. 3A, the video-data-encoding system 104 may generate the initial state video data encodings 206 comprising different encodings of the digital video file 202 that allow for playback under various network conditions and/or on wide array of client devices. In some cases, the initial state video data encodings 206 include a low-loss encoding, a commonly compatible encoding, and basic DASH encodings.

With respect to the virality score 204, the video-data-encoding system 104 can generate the virality score 204 for the digital video file 202 in a variety of ways. In one embodiment, the video-data-encoding system 104 can generate a virality score 204 for the digital video file 202 in which the virality score 204 reflects a priority ranking of an uploading user associated with the digital video file 202. For instance, the priority ranking can reflect a ranking of uploading users according to a number of users of the social networking system subscribed to receive content from the uploading user (e.g., the number of followers that the uploading user has). Moreover, the priority ranking can be based on the number of followers of the uploading user for the digital video file 202 in comparison to other uploading users that are uploading digital video files at approximately the same time.

To generate the virality score 204 to reflect a priority ranking, in some embodiments, the video-data-encoding system 104 can identify a pool of outstanding digital video files to be uploaded, including the digital video file 202. The video-data-encoding system 104 can identify this pool of outstanding digital video files in a number of ways. For example, the video-data-encoding system 104 may identify digital video files that were submitted for upload within a predetermined upload time window (e.g., 10:00:00 pm to 10:00:05 pm in a particular five-second interval). Alternatively, the video-data-encoding system 104 can identify pools of digital video files for uploading on a rolling basis (e.g., chronologically, such as batches of consecutive hundred digital video files, consecutive thousand digital video files).

Based on the digital video files corresponding to a predetermined upload time window or a batch of consecutive uploads, the video-data-encoding system 104 can determine, for the corresponding uploading users, a number of respective followers each uploading user has. Based on the respective number of followers each uploading user has (for that particular upload time window or batch of consecutive uploads), the video-data-encoding system 104 can assign a priority ranking to each digital video file. As an example, the video-data-encoding system 104 may assign a priority ranking of 1 for an uploading user with the most followers, 2 for another uploading user with the next highest number of followers, and so forth.

After the video-data-encoding system 104 determines the priority ranking for the uploading user that uploads the digital video file 202, the video-data-encoding system 104 at the act 208 can determine to transition the digital video file 202 from the initial state to either an upgraded state or to a maintenance state. In particular, the act 208 can include comparing the virality score 204 (e.g., the above-determined priority ranking) with a dynamic transition threshold based on available computing resources. For example, the video-data-encoding system 104 may identify currently available computing resources based on a current (i) usage in terms of time, electricity, or cost, (ii) computational efficiency in terms of processing, and/or (iii) system bandwidth/storage consumption. From the currently available computing resources, the video-data-encoding system 104 can determine, for example, that the dynamic transition threshold allows for a certain number of digital video files to upgrade to the upgraded state (e.g., the top 4,000 videos). To determine the allotted number of digital video files to upgrade, the video-data-encoding system 104 may identify how much each digital video file upgrade will consume (e.g., based on file size, resolution), beginning with the digital video file of the highest priority ranking.

Additionally or alternatively, the video-data-encoding system 104 may determine that the dynamic transition threshold corresponds to a specific portion of one or more currently available computing resources. For example, the video-data-encoding system 104 may define the dynamic transition threshold as 60% of current system bandwidth. In this example, the video-data-encoding system 104 may upgrade as many of the digital video files to the upgraded state (in sequential order according to priority ranking) up to the dynamic transition threshold of 60% of current system bandwidth.

As a priority ranking, if the virality score 204 of the digital video file 202 satisfies the dynamic transition threshold as just described, the video-data-encoding system 104 can transition the digital video file 202 to the upgraded state by generating the upgraded-state-video-data encodings 210. Transitioning the digital video file 202 to the upgraded state may occur as part of the initial uploading process, or, in some cases, after uploading to the social networking system is complete. As will be described in more detail in relation to FIGS. 3A-3B, the upgraded-state-video-data encodings 210 comprise, for example, premium encodings and full DASH encodings. This upgraded set of video data encodings can provide enhanced quality of experience via user interfaces for viewing the digital video file 202 on requesting client devices.

On the other hand, if the virality score 204 as a priority ranking of the digital video file 202 fails to satisfy the dynamic transition threshold, the video-data-encoding system 104 can maintain the digital video file 202 and the corresponding initial state video data encodings 206 in the initial state. Moreover, the video-data-encoding system 104 can periodically recheck an eligibility of the digital video file 202 for transitioning to the upgraded state. For example, the video-data-encoding system 104 at act 208 may compare the priority ranking of the digital video file 202 with the dynamic transition threshold at set intervals following the initial comparison. To illustrate, in some embodiments, the video-data-encoding system 104 may group at least a portion of the digital video files initially failing to satisfy the dynamic transition threshold with another pool of digital video files to be checked against the dynamic transition threshold.

For example, at recheck times of every 2 hours, 12 hours, 24 hours, 3 days, 15 days, etc., the video-data-encoding system 104 may group at least some of the non-upgraded digital video files with a new pool of digital video files to be uploaded at the corresponding recheck time. In turn, the video-data-encoding system 104 may generate (or update) priority rankings, and then compare the priority rankings to an updated dynamic transition threshold (e.g., based on updated available computing resources). Thus, in some embodiments, the video-data-encoding system 104 may later generate a higher priority ranking for a non-upgraded digital video file based on a new comparison with different uploading users. Additionally or alternatively, the updated dynamic transition threshold may allow for more digital video files to be upgraded at the recheck time (e.g., based on more system bandwidth during off-peak uploading times). Accordingly, in response to iteratively rechecking as just described, the video-data-encoding system 104 may transition a previously non-upgraded digital video file in the initial state to the upgraded state and generate the upgraded-state-video-data encodings 210.

In some embodiments, the digital video file 202 remains in the initial state, even after iterative rechecks of the virality score 204 against updated dynamic transition thresholds. In some cases, the digital video file 202 can remain in the initial state for a threshold period of time (e.g., fifteen days, thirty days, ninety days). If after the threshold period of time the virality score 204 as a priority ranking fails to satisfy the dynamic transition threshold (or any of the updated dynamic transition thresholds), the video-data-encoding system 104 can transition the digital video file 202 to the maintenance state. For example, the video-data-encoding system 104 can transition the digital video file 202 to the maintenance state by removing one or more video data encodings of the initial state video data encodings 206. The resulting subset comprises the maintenance-state-video-data encodings 212. For example, as explained in more detail below in relation to FIG. 3B, the video-data-encoding system 104 may remove the basic DASH encodings of the initial state video data encodings 206 to generate the maintenance-state-video-data encodings 212 for the digital video file 202 in the maintenance state.

As previously mentioned, the video-data-encoding system 104 can generate the virality score 204 for the digital video file 202 in a variety of ways. In addition (or in the alternative) to the priority ranking embodiment just described, the video-data-encoding system 104 can generate the virality score 204 for the digital video file 202 reflecting a number of views. In particular, the number of views or view count indicates a number of times the digital video file 202 has been viewed by users of the social networking system.

To generate the virality score 204 as reflecting the view count of the digital video file 202, the video-data-encoding system 104 can determine a number of times that the digital video file 202 has been viewed for at least some threshold viewing duration (e.g., three seconds, ten seconds, thirty seconds). Additionally or alternatively, the video-data-encoding system 104 may generate the virality score 204 by determining a number of times that the digital video file 202 has been viewed to completion. Additionally or alternatively, the video-data-encoding system 104 may generate the virality score 204 by determining a number of times that the digital video file 202 has been accessed (e.g., clicked on). Additionally or alternatively, the video-data-encoding system 104 may generate the virality score 204 by determining a number of times that the digital video file 202 has been viewed for some threshold viewing duration while actively displayed within a user interface of the client device requesting playback.

After the video-data-encoding system 104 determines the virality score 204 reflecting views of the digital video file 202, the video-data-encoding system 104 at the act 208 can determine to transition the digital video file 202 from the initial state to either an upgraded state or to a maintenance state. In particular, the act 208 can include comparing the virality score 204 (e.g., the above-determined view count) with a threshold view count. If the view count satisfies (e.g., meets or exceeds) the threshold view count, the video-data-encoding system 104 can transition the digital video file 202 to the upgraded state by generating the upgraded-state-video-data encodings 210. Otherwise, if the view count fails to satisfy the threshold view count, the video-data-encoding system 104 can maintain the digital video file 202 and the corresponding initial state video data encodings 206 in the initial state.

In addition, as described above, the video-data-encoding system 104 can recheck an eligibility of the digital video file 202 for transitioning to the upgraded state. For example, the video-data-encoding system 104 at act 208 may compare updated view counts (or the originally-checked view count) of the digital video file 202 with the threshold view count at set intervals following the initial comparison. In this manner, the video-data-encoding system 104 may transition a previously non-upgraded digital video file in the initial state to the upgraded state and generate the upgraded-state-video-data encodings 210.

In some embodiments, the digital video file 202 remains in the initial state, even after iterative rechecks of the virality score 204 against threshold view counts. In some cases, the digital video file 202 can remain in the initial state for a threshold period of time (e.g., fifteen days, thirty days, ninety days). If after the threshold period of time the virality score 204 as a view count fails to satisfy the threshold view count, the video-data-encoding system 104 can transition the digital video file 202 to the maintenance state by removing one or more video data encodings of the initial state video data encodings 206.

In addition (or in the alternative) to the priority ranking and view count embodiments just described, the video-data-encoding system 104 can generate the virality score 204 for the digital video file 202 in which the virality score 204 reflects a predicted watchtime. In particular, predicted watchtime indicates a predicted duration of time users of a social networking system will watch a digital video file, a predicted view count, a predicted download count, etc.

To generate the virality score 204 to reflect predicted watchtime for the digital video file 202, in some embodiments, the video-data-encoding system 104 utilizes one or more heuristic approaches. For example, utilizing a social graph (described in detail below in relation to FIG. 9), the video-data-encoding system 104 may identify a particular digital video file associated with the same or a different uploading user that has generated a specific amount of watchtime. Specifically, based on characteristics and attributes associated with the particular digital video file, the video-data-encoding system 104 can generate (or otherwise obtain from the server(s) 102) an affinity score for the digital video file 202 that represents the strength of relationship between the digital video file 202 and the particular digital video file. The video-data-encoding system 104 can then generate a predicted watchtime for the digital video file 202 by weighting the known watchtime of the particular digital video file using the affinity score for the digital video file 202.

Additionally or alternatively to heuristic approaches, the video-data-encoding system 104 may generate the virality score 204 as reflecting predicted watchtime for the digital video file 202 by utilizing a machine-learning model. For example, in some embodiments, the video-data-encoding system 104 utilizes a machine-learning model that can be tuned (e.g., trained) based on inputs to approximate unknown functions. For example, the machine-learning model can include a decision tree model, regression model, gradient boosting algorithm, neural network (e.g., a convolutional neural network, recurrent neural network), and the like.

To illustrate, the video-data-encoding system 104 may utilize a machine-learning model that utilizes various factors to intelligently generate a predicted watchtime. Such factors may include, for instance, a number of followers corresponding to an uploading user, a duration of a digital video file, a subject matter of the digital video file, keywords or phrases detected in the digital video file, metadata (e.g., timestamp data, language data, location data), or other suitable factors. Additionally or alternatively, in some embodiments, the video-data-encoding system 104 may utilize various factors to update a previously predicted watchtime for a digital video file. For example, the video-data-encoding system 104 may regenerate a predicted watchtime for a digital video file based on actual watchtime during some predetermined time period after upload to the social networking system (e.g., 12 hours later, 24 hours later), user engagement (e.g., comments, shares, likes), or other suitable metric (e.g., exponentially decayed watchtime).

In some embodiments, the video-data-encoding system 104 can train a machine-learning model to generate a predicted watchtime for a digital video file based on ground truth data (e.g., labeled digital video files with labeled watchtimes). For example, the video-data-encoding system 104 can utilize a neural network to analyze training data comprising digital video files associated with one or more of the foregoing factors mentioned above. In turn, the neural network can generate predicted watchtimes for the digital video files in the training data. Based on a comparison between the predicted watchtimes and the ground truth watchtimes (e.g., by applying a loss function), the video-data-encoding system 104 can learn to predict watchtimes of digital video files by backpropagating a measure of loss reflecting differences between the predicted watchtimes and the ground truth data.

After the video-data-encoding system 104 determines the virality score 204 reflecting predicted watchtime of the digital video file 202, the video-data-encoding system 104 at the act 208 can determine to transition the digital video file 202 from the initial state to either an upgraded state or to a maintenance state as described above. In particular, the act 208 can include comparing the virality score 204 (e.g., the above-determined predicted watchtime) with a threshold predicted watchtime. If the predicted watchtime satisfies (e.g., meets or exceeds) the threshold predicted watchtime, the video-data-encoding system 104 can transition the digital video file 202 to the upgraded state by generating the upgraded-state-video-data encodings 210. Otherwise, if the predicted watchtime fails to satisfy the threshold view count, the video-data-encoding system 104 can maintain the digital video file 202 and the corresponding initial state video data encodings 206 in the initial state.

In addition, as described above, the video-data-encoding system 104 can recheck an eligibility of the digital video file 202 for transitioning to the upgraded state. For example, the video-data-encoding system 104 at the act 208 may compare updated predicted watchtimes (or the originally predicted watchtime) of the digital video file 202 with the threshold predicted watchtime at set intervals following the initial comparison. In this manner, the video-data-encoding system 104 may transition a previously non-upgraded digital video file in the initial state to the upgraded state and generate the upgraded-state-video-data encodings 210.

In some embodiments, the digital video file 202 remains in the initial state, even after iterative rechecks of the virality score 204 against the threshold predicted watchtime. If after the threshold period of time the virality score 204 as a predicted watchtime fails to satisfy the threshold predicted watchtime, the video-data-encoding system 104 can transition the digital video file 202 to the maintenance state by removing one or more video data encodings of the initial state video data encodings 206.

Figure 3A:
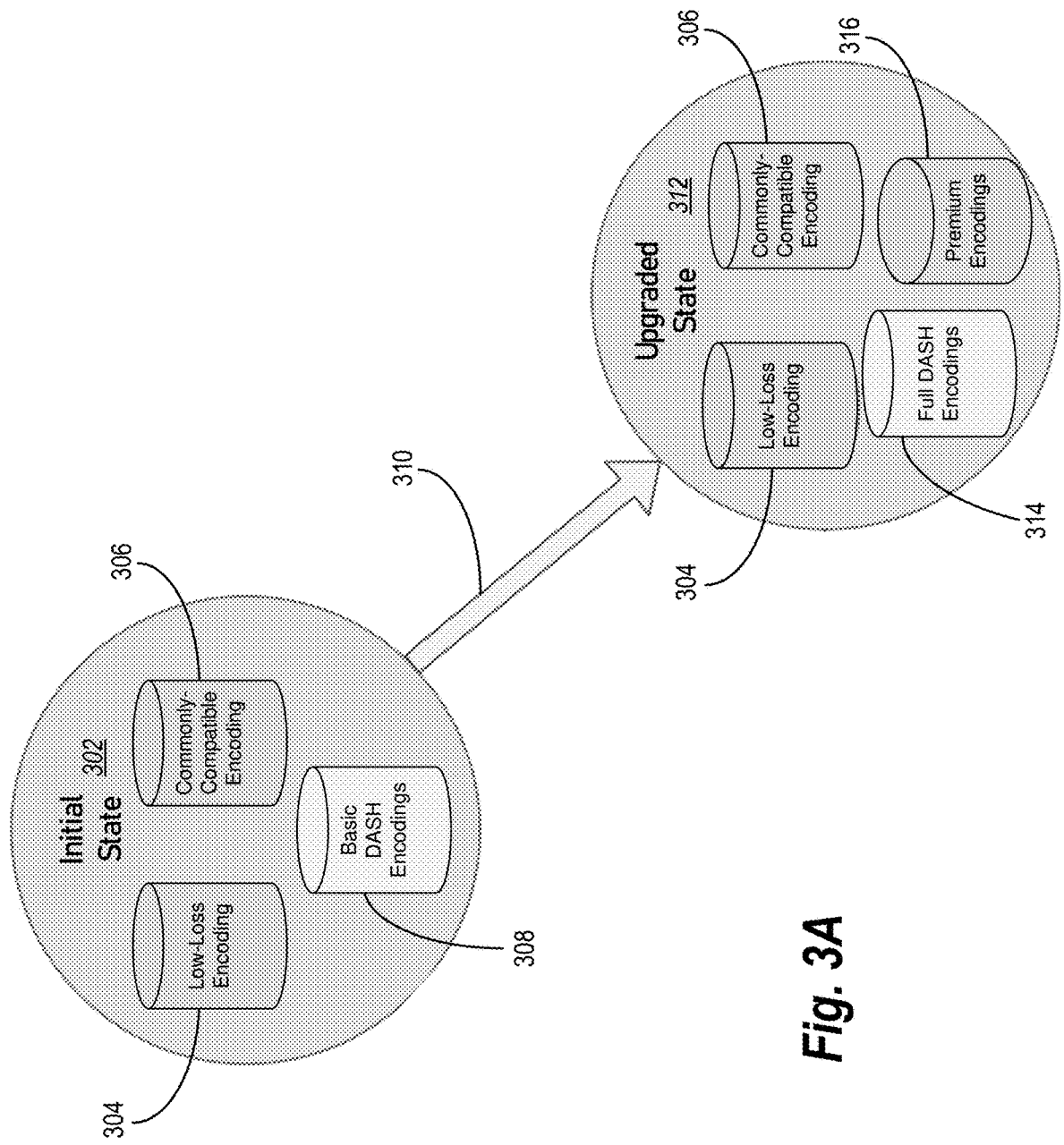
FIGS. 3A-3B illustrate a video-data-encoding system transitioning a digital video file between or among encoding states by generating or removing video data encodings in accordance with one or more embodiments.
Figure 3B:
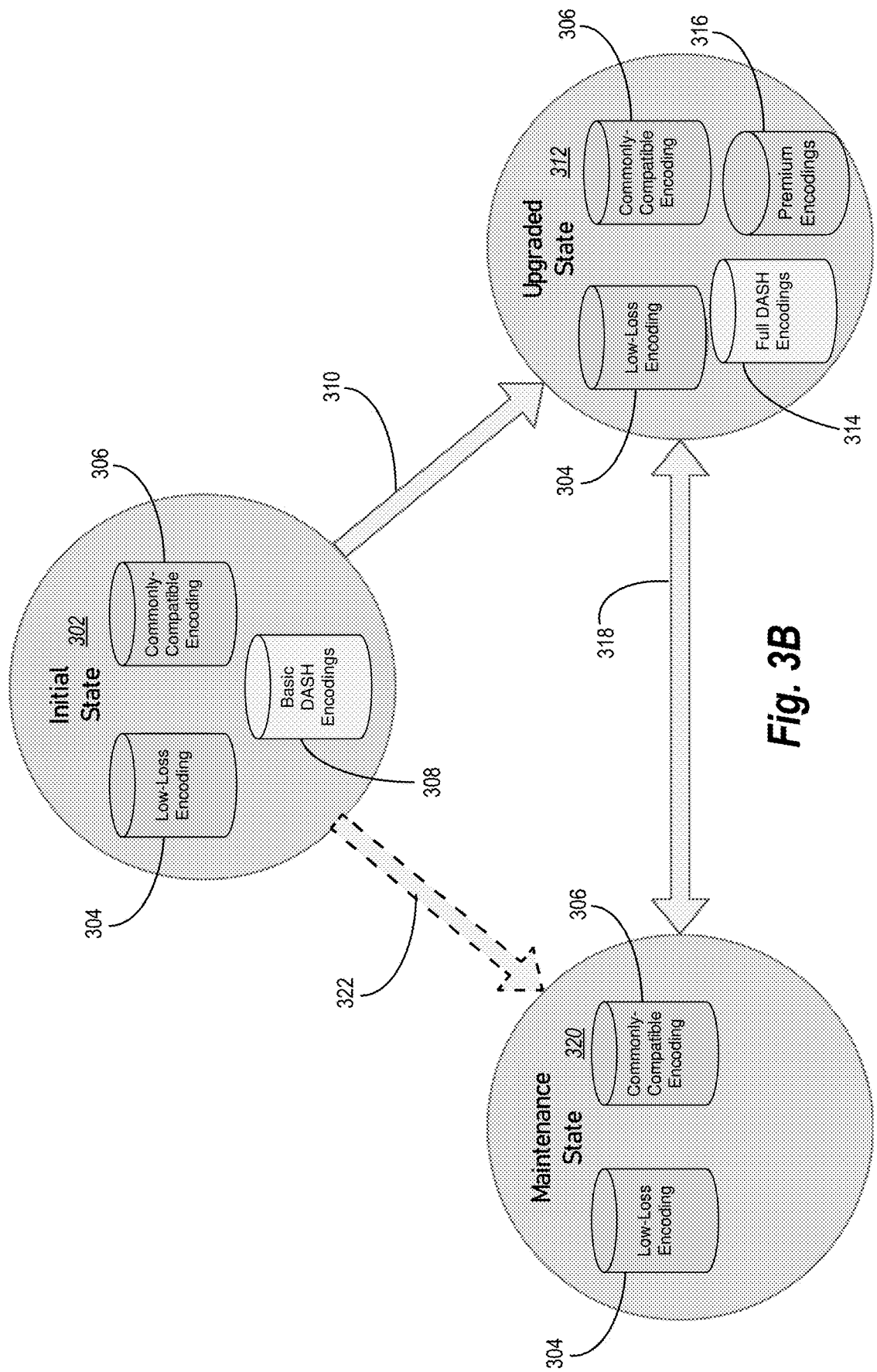

As mentioned above, the video-data-encoding system 104 can transition a digital video file from one state to another state in response to determining that a virality score of a digital video file satisfies a transition threshold or that expiration of threshold time period has lapsed. In accordance with one or more embodiments, FIGS. 3A-3B illustrate the video-data-encoding system 104 transitioning a digital video file between or among states by generating or removing video data encodings. As shown for an initial state 302 in FIG. 3A, the video-data-encoding system 104 generates video data encodings comprising a low-loss encoding 304, a commonly compatible encoding 306, and basic DASH encodings 308 (e.g., in response to receiving a digital video file for upload to a social networking system).

The low-loss encoding 304 comprises a video data encoding based upon which the video-data-encoding system 104 can generate additional video data encodings at a later time. For example, the video-data-encoding system 104 may generate the low-loss encoding 304 using lossy compression algorithms which reduce or remove only small amounts of raw video data (and therefore have low compression ratios). In other embodiments, the video-data-encoding system 104 may generate the low-loss encoding 304 using loss-less compression algorithms. In so doing, the video-data-encoding system 104 can generate additional encodings from the low-loss encoding 304 (largely) without introducing artifacts or information loss. In addition, the video-data-encoding system 104 can preserve high resolution (e.g., greater than 1080p) capability and/or subsequent loss-less compression transmission techniques.

The commonly compatible encoding 306 comprises a video data encoding that client devices can commonly playback or for which client devices commonly comprise compatible software to decompress or play the corresponding digital video file. Accordingly, the commonly compatible encoding 306 may comprise a standard encoding commonly recognized by client devices. Further, the video-data-encoding system 104 may generate the commonly compatible encoding 306 using compression algorithms with high compression ratios to sufficiently compress the digital video file for playback on standard client devices, low-end client devices, and/or via poor network connections. For example, the commonly compatible encoding 306 may include an H.264 standard encoding (e.g., the baseline profile encoding for limited computing resources) of the digital video file in the initial state 302.

In some cases, the basic DASH encodings 308 comprises both a higher quality DASH encoding (e.g., for higher resolution playback on more capable client devices) and a lower quality DASH encoding (e.g., for lower resolution playback on less capable client devices). Where the higher quality DASH encoding of the basic DASH encodings 308 can later determine the spectrum of full DASH encodings 314 described below, in some cases, the video-data-encoding system 104 can generate the higher quality DASH encoding of the basic DASH encodings 308 based on a virality score of the digital video file. For example, the video-data-encoding system 104 may generate the higher quality DASH encoding of the basic DASH encodings 308 so as to allow more renditions or available resolutions of the digital video file in the future (e.g., for digital video files likely to go viral).

Additionally, in some embodiments, the basic DASH encodings 308 includes a set of video data encodings that the video-data-encoding system 104 uses to facilitate adaptive bitrate streaming. Accordingly, in some implementations, the video-data-encoding system 104 generates the basic DASH encodings 308 utilizing one or more bit rate adaptation (ABR) algorithms. In these or other embodiments, one or more of the basic DASH encodings 308 can provide improved playback performance (e.g., higher resolution playback), relative to the commonly compatible encoding 306, at client devices requesting playback of the digital video file.

Based on the digital video file satisfying a transition threshold as described above, the video-data-encoding system 104 can transition the digital video file from the initial state 302 to an upgraded state 312 (e.g., as denoted by a transition arrow 310). In particular, the video-data-encoding system 104 can transition the digital video file from the initial state 302 to the upgraded state 312 by generating one or more additional sets of video data encodings, including full DASH encodings 314 and premium encodings 316. For example, the video-data-encoding system 104 can generate the full DASH encodings 314 and/or the premium encodings 316 in response to a virality score associated with the digital video file (e.g., a priority ranking, a view count, a predicted watchtime) satisfying a transition threshold. With the addition of the full DASH encodings 314 and the premium encodings 316, the video-data-encoding system 104 can improve playback performance and device compatibility.

In some embodiments, the video-data-encoding system 104 can generate the full DASH encodings 314 by utilizing the basic DASH encodings 308. In particular, utilizing the highest quality DASH encoding of the basic DASH encodings 308, the video-data-encoding system 104 can generate additional video data encodings of lesser quality to create the full DASH encodings 314. Accordingly, the video-data-encoding system 104 can generate more sets of the full DASH encodings 314 when the highest quality DASH encoding initially generated for the basic DASH encodings 308 is of sufficiently high quality to create various levels of intermediate-quality (or lower-quality) DASH encodings. Additionally or alternatively, the higher the virality score associated with the digital video file, the more sets of DASH encodings the video-data-encoding system 104 may choose to generate for the full DASH encodings 314 when transitioning the digital video file to the upgraded state 312. In some embodiments, however, the video-data-encoding system 104 may generate the full DASH encodings 314 only for digital video files which correspond to a sufficiently high virality score (e.g., an uploading user with over 1 million followers). Thus, in some implementations, the full DASH encodings 314 may comprise the basic DASH encodings 308 and no additional DASH encodings.

In addition to the full DASH encodings 314 for the upgraded state 312, the video-data-encoding system 104 can also generate the premium encodings 316. In particular, the video-data-encoding system 104 can generate one or more sets of the premium encodings 316, depending on the virality score associated with the digital video file. For example, some digital video files may (e.g., under a cost-benefit analysis described below) qualify for only one set of the premium encodings 316, while other digital video files (e.g., with higher virality scores) may qualify for two or more sets of the premium encodings 316. In these or other embodiments, each set of the premium encodings 316 may include some of the highest quality video data encodings for optimal user experience on high-end devices and/or via excellent network connectivity. As an example, the premium encodings 316 may include video data encodings such as VP9 or AV1.

With respect to FIG. 3B, the video-data-encoding system 104 can also transition the digital video file from the upgraded state 312 to a maintenance state 320 (e.g., as indicated via a transition arrow 318). In particular, the video-data-encoding system 104 can transition the digital video file from the upgraded state 312 to the maintenance state 320 by removing one or more video data encodings from the upgraded state 312. To illustrate, the video-data-encoding system 104 may determine a threshold time period has elapsed since uploading the digital video file or since remaining in the upgraded state 312. Based on determining that the threshold time period has elapsed, the video-data-encoding system 104 can remove (e.g., automatically remove) at least one encoding set of the premium encodings 316 and/or the full DASH encodings 314. By removing such encodings after an elapsed time, some encodings are ephemeral. For instance, as shown in FIG. 3B, the video-data-encoding system 104 may remove each of the full DASH encodings 314 and the premium encodings 316, leaving the video data encodings for the maintenance state 320 as comprising the low-loss encoding 304 and the commonly compatible encoding 306.

Additionally or alternatively to an ephemeral encoding as just described, the video-data-encoding system 104 may transition the digital video file from the upgraded state 312 to the maintenance state 320 in response to an updated virality score being lower than a transition threshold. In some cases, the transition threshold for transitioning the digital video file from the upgraded state 312 to the maintenance state 320 is a modified/updated transition threshold that is different from (e.g., less than) the transition threshold used to determine transitioning to the upgraded state 312. In other embodiments, the transition threshold for transitioning the digital video file from the upgraded state 312 to the maintenance state 320 is the same as the transition threshold used to determine transitioning to the upgraded state 312.

In yet another additional or alternative embodiment, the video-data-encoding system 104 may transition the digital video file from the upgraded state 312 to the maintenance state 320 in order to free up more storage space. For example, where storage space is limited, the video-data-encoding system 104 may, upon reaching some threshold storage space (or lack thereof), request the video-data-encoding system 104 to transition the digital video file from the upgraded state 312 to the maintenance state 320. In these or other embodiments, the threshold storage space may be configurable according to user settings. In another example, the video-data-encoding system 104 may, in response to a user input at an administrator device in communication with the server(s) 102, request the video-data-encoding system 104 to transition the digital video file from the upgraded state 312 to the maintenance state 320.

In some embodiments, the video-data-encoding system 104 may transition the digital video file from the upgraded state 312 to the maintenance state 320 in phases. As an example, the video-data-encoding system 104 may remove one or more sets of the full DASH encodings 314 and/or the premium encodings 316 at different times. To illustrate, the video-data-encoding system 104 may first remove video data encodings of the full DASH encodings 314 and/or the premium encodings 316 that are less utilized for playback of the digital video file (e.g., as measured according to watch-time, view count). The video-data-encoding system 104 may then remove video data encodings of the full DASH encodings 314 and/or the premium encodings 316 that are more utilized, and subsequently video data encodings which are most utilized, until removal is complete. In a same or similar manner, the video-data-encoding system 104 may phase out video data encodings corresponding to other suitable metrics, such as by corresponding video resolution.

As additionally shown in FIG. 3B, the video-data-encoding system 104 can transition the digital video file from the maintenance state 320 to the upgraded state 312 (e.g., as indicated by the transition arrow 318, which is bi-directional). In some embodiments, the video-data-encoding system 104 may determine to transition the digital video file from the maintenance state 320 to the upgraded state 312 based on an updated virality score (e.g., an updated priority ranking, an updated view count, an updated predicted watch-time) in relation to a transition threshold. The video-data-encoding system 104 may generate an updated virality score in a same or similar manner as described above in relation to the virality score 204 of FIG. 2. For example, based on an updated view count of a digital video file exceeding a threshold view count, the video-data-encoding system 104 may generate one or more sets of the full DASH encodings 314 and/or the premium encodings 316.

As described above with respect to transitioning the digital video file from the upgraded state 312 to the maintenance state 320, the video-data-encoding system 104 can similarly phase into (e.g., back into) the upgraded state 312. For example, the video-data-encoding system 104 may transition the digital video file to the upgraded state 312 comprising specific tiers. In a first tier of the upgraded state 312, for instance, the video-data-encoding system 104 may generate basic DASH encodings. For a second tier of the upgraded state 312 (e.g., reserved for digital video files of virality scores in excess of a threshold second tier virality score), the video-data-encoding system 104 may generate the full DASH encodings 314. Additionally or alternatively, the video-data-encoding system 104 may generate a first set of the premium encodings 316 for the first tier of the upgraded state 312. Upon achieving a threshold second tier virality score for the second tier, the video-data-encoding system 104 may generate a second set of the premium encodings 316.

In some embodiments, the video-data-encoding system 104 can transition a digital video file from the upgraded state 312 to the maintenance state 320 based on a cost-benefit analysis. For example, in one or more embodiments, the upgraded state 312 comprises various tiers as just described. Each tier corresponds to different video data encodings, including different computational resources needed to generate such video data encodings of the respective tiers. For instance, in some embodiments, the video-data-encoding system 104 can estimate a cost of computational resources needed to generate a video data encoding based on prior generation of other video data encodings. To illustrate, the video-data-encoding system 104 can approximate a computational cost value for a particular video data encoding based on an average computational cost value previously needed to generate the particular video data encoding.

In some implementations, the cost analysis can be more tailored to each digital video file. For example, the video-data-encoding system 104 can determine a cost of computational resources needed to generate a video data encoding based on various attributes specific to a digital video file, such as duration (length of time or file size), content, or complexity. To illustrate, the video-data-encoding system 104 can assess a complexity of a digital video file by analyzing frame content (individually or in group sequences), metadata, etc. that corresponds to the digital video file. For instance, metadata of the digital video file can provide information about the timing of video frames, the color space used in the video signal, three-dimensional stereoscopic frame packing information, or spatial segmentation. Using this information, the video-data-encoding system 104 can quantify the complexity of encoding a digital video file and, in turn, quantify the cost of computational resources for generating a video data encoding.

In addition, the video-data-encoding system 104 can ascribe (e.g., predict) one or more benefits for generating a particular video data encoding (e.g., a predicted amount of additional watchtime the video data encoding will generate if created). To predict a benefit for generating a particular video data encoding, the video-data-encoding system 104 can compare an actual watchtime for the digital video file and a predicted watchtime (e.g., a virality score) for the digital video file as described in relation to FIG. 2. If the actual watchtime for a digital video file exceeds or is similar to (e.g., within some threshold percentage of) the predicted watchtime, then the video-data-encoding system 104 may determine that the benefit for generating a particular additional video data encoding is relatively low. On the other hand, if the actual watchtime for the digital video file is lower than (e.g., outside some threshold percentage of) the predicted watchtime, the video-data-encoding system 104 may determine that the benefit for generating the particular additional video data encoding is relatively high.

Based on the foregoing cost-benefit analyses, the video-data-encoding system 104 can compare the computational costs with the predicted benefit of generating one or more additional video data encodings. If the computational costs exceed the predicted benefit, the video-data-encoding system 104 may determine (at least initially) not to generate one or more additional video data encodings reserved for some tiers of the upgraded state 312. For example, when transitioning the digital video file to the upgraded state 312 from the maintenance state 320 or the initial state 302, the video-data-encoding system 104 may determine to generate the video data encodings for a first tier of the upgraded state 312, but not the video data encodings for a second tier of the upgraded state 312. At a later point in time, the video-data-encoding system 104 may, in response to an upgraded cost-benefit analysis (e.g., incorporating an updated predicted watchtime), determine to generate one or more additional video data encodings corresponding to a second tier of the upgraded state 312. In these or other embodiments, if the predicted benefit exceeds the computational costs, the video-data-encoding system 104 may determine to generate one or more additional video data encodings when transitioning a digital video file to the upgraded state 312 (or from tier-to-tier in the upgraded state 312).

As further shown in FIG. 3B, the video-data-encoding system 104 can transition the digital video file from the initial state 302 to the maintenance state 320 (e.g., as indicated via a transition arrow 322), instead of the upgraded state 312. In particular, the video-data-encoding system 104 can transition the digital video file to the maintenance state 320 from the initial state 302 by removing one or more video data encodings from the initial state 302. To illustrate, the video-data-encoding system 104 may determine a threshold time period has elapsed since uploading the digital video file in the initial state 302. Based on determining that the threshold time period has elapsed, the video-data-encoding system 104 can remove (e.g., automatically remove) at least one encoding set of the basic DASH encodings 308, such as the highest quality DASH encoding that consumes the most storage space. Otherwise, as shown in FIG. 3B, the video-data-encoding system 104 may remove each of the basic DASH encodings 308, leaving the video data encodings for the maintenance state 320 as comprising the low-loss encoding 304 and the commonly compatible encoding 306.

Additionally or alternatively to ephemeral encodings just described, the video-data-encoding system 104 may transition the digital video file from the initial state 302 to the maintenance state 320 in response to an updated virality score being lower than a transition threshold. For example, upon expiration of a threshold time period, the video-data-encoding system 104 may generate an updated virality score and determine the updated virality score fails to satisfy the transition threshold. In some cases, the transition threshold for transitioning the digital video file from the initial state 302 to the maintenance state 320 is a modified/updated transition threshold that is different from (e.g., less than) the transition threshold used to determine transitioning a digital video file to the upgraded state 312. For example, to decrease storage consumption, the video-data-encoding system 104 can dynamically alter the transition threshold (or create a new transition threshold) for determining to transition the digital video file from the initial state 302 to the maintenance state 320 (or between any state). To illustrate, the video-data-encoding system 104 may define a range of virality scores for digital video files that, when satisfied, causes the video-data-encoding system 104 to automatically transition a digital video file from state to state (in this case the initial state 302 to the maintenance state 320). In other embodiments, the transition threshold for transitioning the digital video file from the initial state 302 to the maintenance state 320 is the same as the transition threshold used to determine transitioning to the upgraded state 312.

Alternatively to transitioning a digital video file from the initial state 302 to the maintenance state 320, in some embodiments, the video-data-encoding system 104 may maintain a digital video file in the initial state 302. As the dashed lines of the transition arrow 322 suggest, in some embodiments, the video-data-encoding system 104 does not transition the digital video file from the initial state 302 to the maintenance state 320—at least for a period of time. Instead, the video-data-encoding system 104 maintains one or more of the basic DASH encodings 308. In these or other embodiments, the video-data-encoding system 104 can decrease storage consumption of video data encodings in other ways, for example, by dynamically altering the low-loss encoding 304. For instance, the video-data-encoding system 104 can save storage space by redefining the low-loss encoding 304 using lossy compression algorithms that reduce or remove greater amounts of raw video data (and therefore have greater compression ratios) than the original low-loss encoding 304.

Figure 4B:
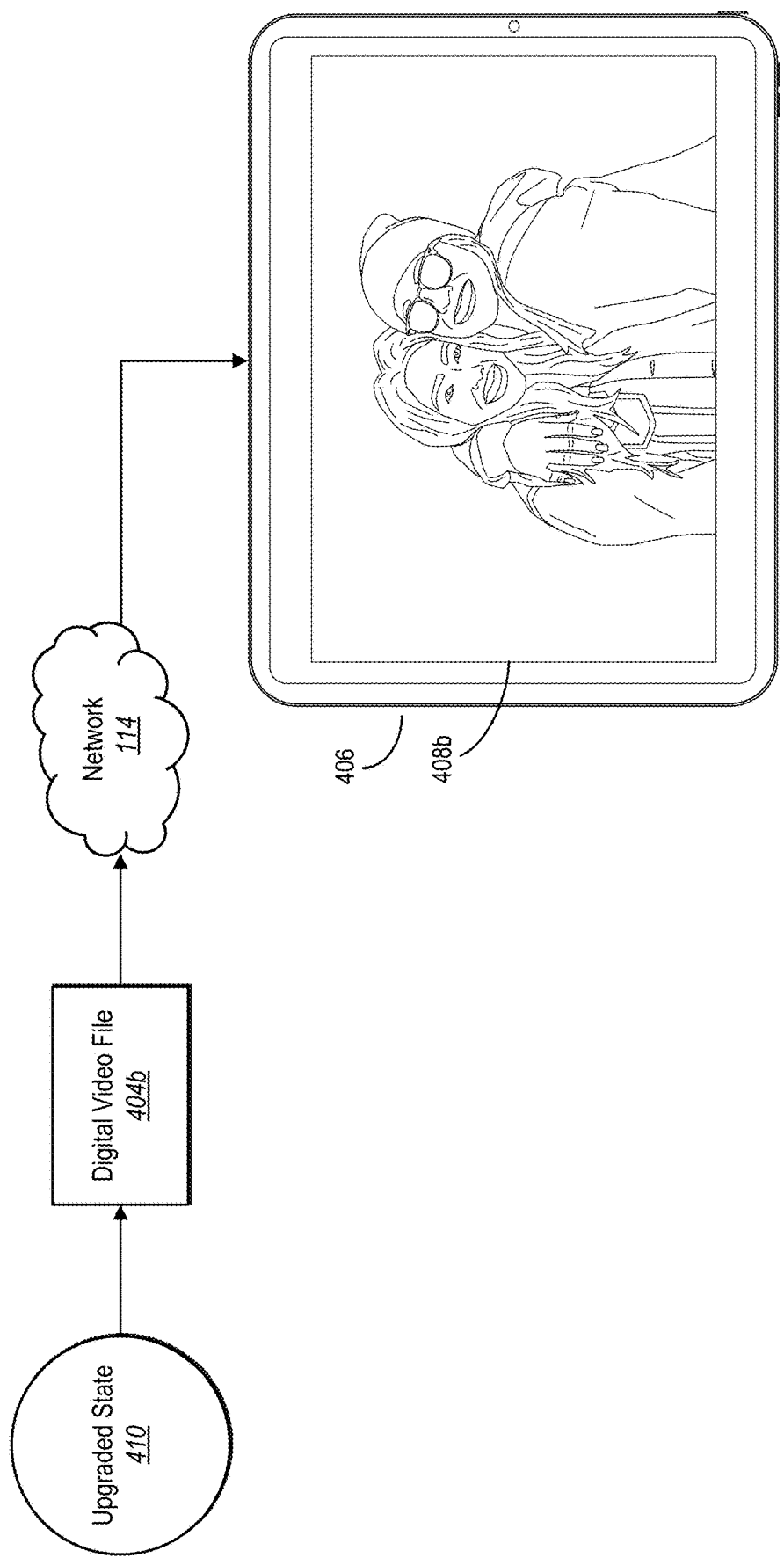
Figure 4C:
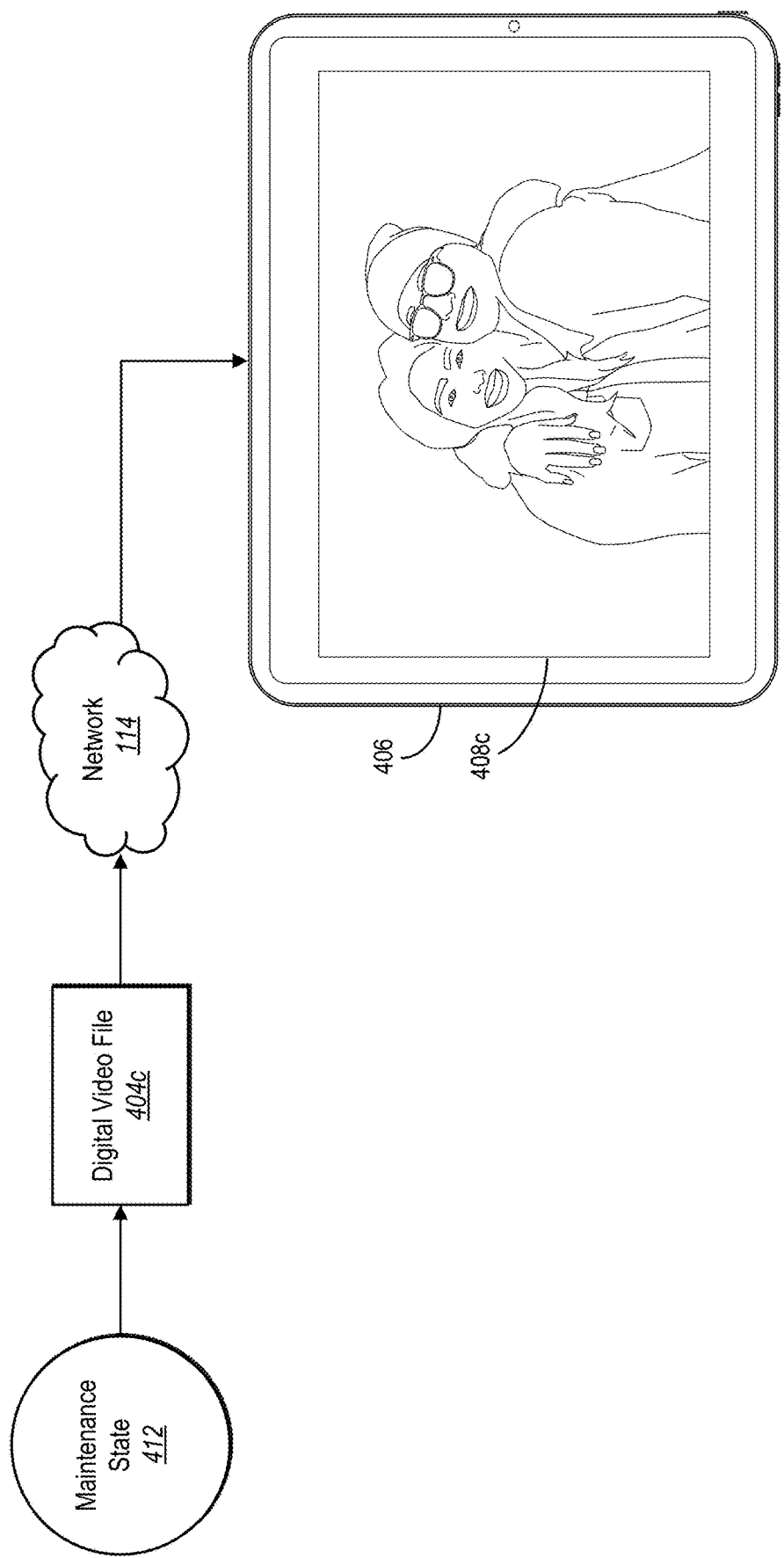

As mentioned above, the video-data-encoding system 104 can send a digital video file to a client device requesting playback of the digital video file. FIGS. 4A-4C illustrate the video-data-encoding system 104 transmitting digital video files of varying video data encodings for display on a client device in accordance with one or more embodiments. For example, as shown in FIG. 4A, the video-data-encoding system 104 can transmit, to a client device 406 via the network 114, a digital video file 404a encoded in accordance with one or more video data encodings of an initial state 402. In turn, the video-data-encoding system 104 can provide, for display within a user interface 408a of the client device 406, a visual representation of the digital video file 404a.

For instance, the video-data-encoding system 104 can encode the digital video file 404a in the initial state 402 by generating an initial set of video data encodings for a digital video file submitted by an uploading user device. In response to receiving the digital video file for uploading to a social networking system, in some cases, the video-data-encoding system 104 can generate different renditions of the submitted digital video file, including the digital video file 404a (e.g., a basic DASH encoding) as described above in relation to FIGS. 3A-3B. Based on an initial virality score associated with the digital video file failing to satisfy a transition threshold, the video-data-encoding system 104 may keep the digital video file 404a as one of the renditions of the digital video file accessible for playback while in the initial state 402.

In response to receiving a request from the client device 406 to playback the digital video file, the video-data-encoding system 104 can transmit one of the renditions of the digital video file in the initial state 402, namely the digital video file 404a. Accordingly, the visual representation of the digital video file 404a as depicted in the user interface 408a corresponds to a quality level (e.g., a middle-grade resolution) consistent with one of the basic DASH encodings. Although in the initial state 402 the video-data-encoding system 104 may transmit a digital video file associated with the commonly compatible encoding, for diversity of illustration, FIG. 4C and the corresponding description instead provide an example transmission embodiment associated with the commonly compatible encoding. Moreover, the video-data-encoding system 104 may transmit the digital video file 404a (e.g., as a basic DASH encoding and not a commonly compatible encoding) to the client device 406 in response to determining the client device 406 has sufficient device capability and network connectivity to playback the digital video file 404a.

Similarly, FIG. 4B shows the video-data-encoding system 104 transmitting, to a client device 406 via the network 114, a digital video file 404b encoded in accordance with one or more video data encodings of an upgraded state 410. In turn, the video-data-encoding system 104 can provide, for display within a user interface 408b of the client device 406, a visual representation of the digital video file 404b.

For example, the video-data-encoding system 104 can encode the digital video file 404b in the upgraded state 410 by generating an upgraded set of video data encodings for the digital video file submitted by the uploading user device. In response to an updated virality score associated with the digital video file (e.g., the digital video file 404a of FIG. 4A) satisfying a transition threshold, in some cases, the video-data-encoding system 104 may generate additional video data encodings (e.g., premium encodings as described above in relation to FIGS. 3A-3B) for one or more upgraded renditions of the digital video file accessible for playback while in the upgraded state 410.

In response to receiving a request from the client device 406 to playback the digital video file, the video-data-encoding system 104 can transmit one of the renditions of the digital video file in the upgraded state 410, including the digital video file 404b. Accordingly, the visual representation of the digital video file 404b as depicted in the user interface 408b corresponds to a quality level (e.g., a higher resolution) consistent with one of the premium encodings. In the upgraded state 410, the video-data-encoding system 104 may transmit a digital video file associated with any one of an array of video data encodings. FIG. 4B shows, by way of example, a depiction of the visual representation for the digital video file 404b encoded with a premium encoding. Moreover, the video-data-encoding system 104 may transmit the digital video file 404b (e.g., as a premium encoding and not another encoding) to the client device 406 in response to determining the client device 406 has sufficient device capability and network connectivity to playback the digital video file 404b.

Likewise, FIG. 4C shows the video-data-encoding system 104 transmitting, to a client device 406 via the network 114, a digital video file 404c encoded in accordance with one or more video data encodings of a maintenance state 412. In turn, the video-data-encoding system 104 can provide, for display within a user interface 408c of the client device 406, a visual representation of the digital video file 404c.

For example, the video-data-encoding system 104 can transition the digital video file to the maintenance state 412 by removing one or more of the initial set of video data encodings and/or the upgraded set of video data encodings generated for the digital video file. In response to an updated virality score associated with the digital video file (e.g., the digital video file 404a or the digital video file 404b) failing to satisfy a transition threshold, in some cases, the video-data-encoding system 104 may transition the digital video file to the maintenance state 412. Additionally or alternatively, in response to determining a threshold time period has elapsed, the video-data-encoding system 104 may transition the digital video file to the maintenance state 412, for example, by removing at least one encoding set to leave at least the commonly compatible encoding accessible for playback.

In response to receiving a request from the client device 406 to playback the digital video file, the video-data-encoding system 104 can transmit one of the renditions of the digital video file in the maintenance state 412, including the digital video file 404c. Accordingly, the visual representation of the digital video file 404c as depicted in the user interface 408c corresponds to a quality level (e.g., a lower resolution) consistent with a commonly compatible encoding. In this manner, the video-data-encoding system 104 can decrease storage consumption and provide the digital video file 404c for display on most any client device requesting playback.

Figure 5:
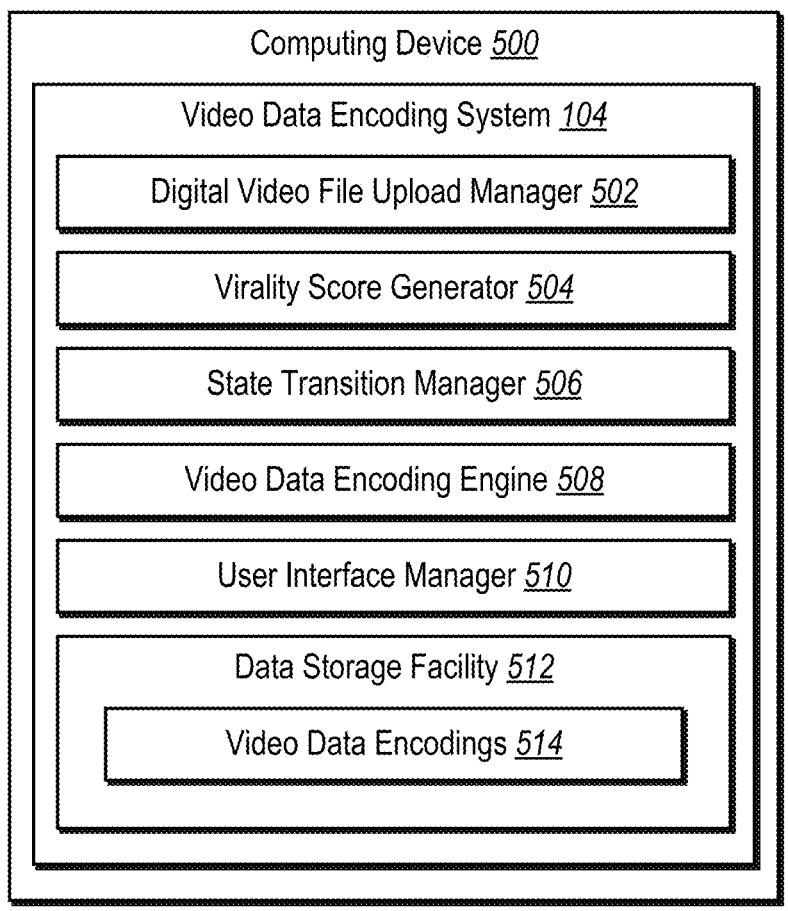
FIG. 5 illustrates an example schematic diagram of a video-data-encoding system in accordance with one or more embodiments.

Turning to FIG. 5, additional detail will now be provided regarding various components and capabilities of the video-data-encoding system 104. In particular, FIG. 5 illustrates an example schematic diagram of a computing device 500 (e.g., the server(s) 102, the client devices 108a-108n, and/or the client device 406) implementing the video-data-encoding system 104 in accordance with one or more embodiments of the present disclosure. As shown, the video-data-encoding system 104 is further implemented by the server(s) 102. Also illustrated, the video-data-encoding system 104 can include a digital video file upload manager 502, a virality score generator 504, a state transition manager 506, a video data encoding engine 508, a user interface manager 510, and a data storage facility 512.

The digital video file upload manager 502 can receive digital video files for uploading to a social networking system (as described in relation to the foregoing figures). In particular, the digital video file upload manager 502 can receive an upload communication or request, at least a part of which includes a digital video file for uploading to the social networking system. For example, the digital video file upload manager 502 can receive a digital video file that includes raw video data that is uncompressed (e.g., as included within a camera, computing device, or digital editing system). In other embodiments, the digital video file upload manager 502 can receive a digital video file that includes video data pre-compressed in accordance with a specific codec (e.g., compression/decompression algorithms) and a corresponding container (e.g., a video format for storing codecs, metadata) as generated by a computing device when recording, storing, or uploading the digital video file.

The virality score generator 504 can generate virality scores associated with a digital video file in a number of ways (as described in relation to the foregoing figures). For example, the virality score generator 504 can generate a priority ranking for the digital video file according to a number of users of the social networking system subscribed to receive content from the uploading user. Additionally or alternatively, the virality score generator 504 can determine a number of views of the digital video file by users of the social networking system. Additionally or alternatively, the virality score generator 504 can generate a predicted watchtime of the digital video file.

The state transition manager 506 can determine whether a virality score satisfies a transition threshold for transitioning a digital video file to another state (as described in relation to the foregoing figures). For example, the state transition manager 506 can determine that a virality score satisfies the transition threshold by comparing the priority ranking for the digital video file to a dynamic transition threshold based on available computing resources. Additionally or alternatively, the state transition manager 506 can determine that a virality score satisfies the transition threshold by determining that the number of views of the digital video file exceeds or equals a threshold view count. Additionally or alternatively, the state transition manager 506 can determine that a virality score satisfies the transition threshold by determining that the predicted watchtime of the digital video file exceeds or equals a threshold predicted watchtime. Additionally or alternatively, the state transition manager 506 can determine a threshold time period has elapsed since uploading the digital video file.

Based on one or more determinations by the state transition manager 506, the video-data-encoding system 104 can transition a digital video file from state to state by encoding the digital video file (as described in relation to the foregoing figures). For example, the video data encoding engine 508 can encode the digital video file in the initial state by generating an initial set of video data encodings for the digital video file. Further, based on a virality score comparison to a transition threshold by the state transition manager 506, the video data encoding engine 508 can encode a digital video file in the upgraded state by generating an upgraded set of video data encodings for the digital video file. Additionally or alternatively, based on an updated virality score comparison and/or identifying expiration of a threshold time period by the state transition manager 506, the video data encoding engine 508 can remove one or more of the upgraded and/or initial set of video data encodings for the digital video file to transition the digital video file to a maintenance state.

The user interface manager 510 can provide, manage, and/or control a graphical user interface (or simply "user interface"). In particular, the user interface manager 510 may generate and display a user interface by way of a display screen composed of a plurality of graphical components, objects, and/or elements that allow a user to perform a function. For example, the user interface manager 510 can receive user inputs from a user, such as a click/tap to upload a digital video file or request playback of a digital video file. Additionally, the user interface manager 510 can present various types of information, including text, digital media, etc. in a variety of different arrangements for implementation in a social networking system. For example, the user interface manager 510 can provide, for display within a requesting client device (e.g., the computing device 500, the client device 406, and/or the client devices 108*a*-108*n*), a digital video file for playback in accordance with a request to playback the digital video file.

The data storage facility 512 maintains data for the video-data-encoding system 104. The data storage facility 512 (e.g., via one or more memory devices) can maintain data of any type, size, or kind, as necessary to perform the functions of the video-data-encoding system 104. For example, the data storage facility 512 may include video data encodings 514, which comprise video data encodings corresponding to digital video file in an initial state, maintenance state, and/or upgraded state.

Each of the components of the computing device 500 can include software, hardware, or both. For example, the components of the computing device 500 can include one or more instructions stored on a computer-readable storage medium and executable by processors of one or more computing devices, such as a client device or server device. When executed by the one or more processors, the computer-executable instructions of the video-data-encoding system 104 can cause the computing device(s) (e.g., the computing device 500) to perform the methods described herein. Alternatively, the components of the computing device 500 can include hardware, such as a special-purpose processing device to perform a certain function or group of functions. Alternatively, the components of the computing device 500 can include a combination of computer-executable instructions and hardware.

Furthermore, the components of the computing device 500 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 500 may be implemented as a stand-alone application, such as a desktop or mobile application. Furthermore, the components of the computing device 500 may be implemented as one or more web-based applications hosted on a remote server.

Figure 6:
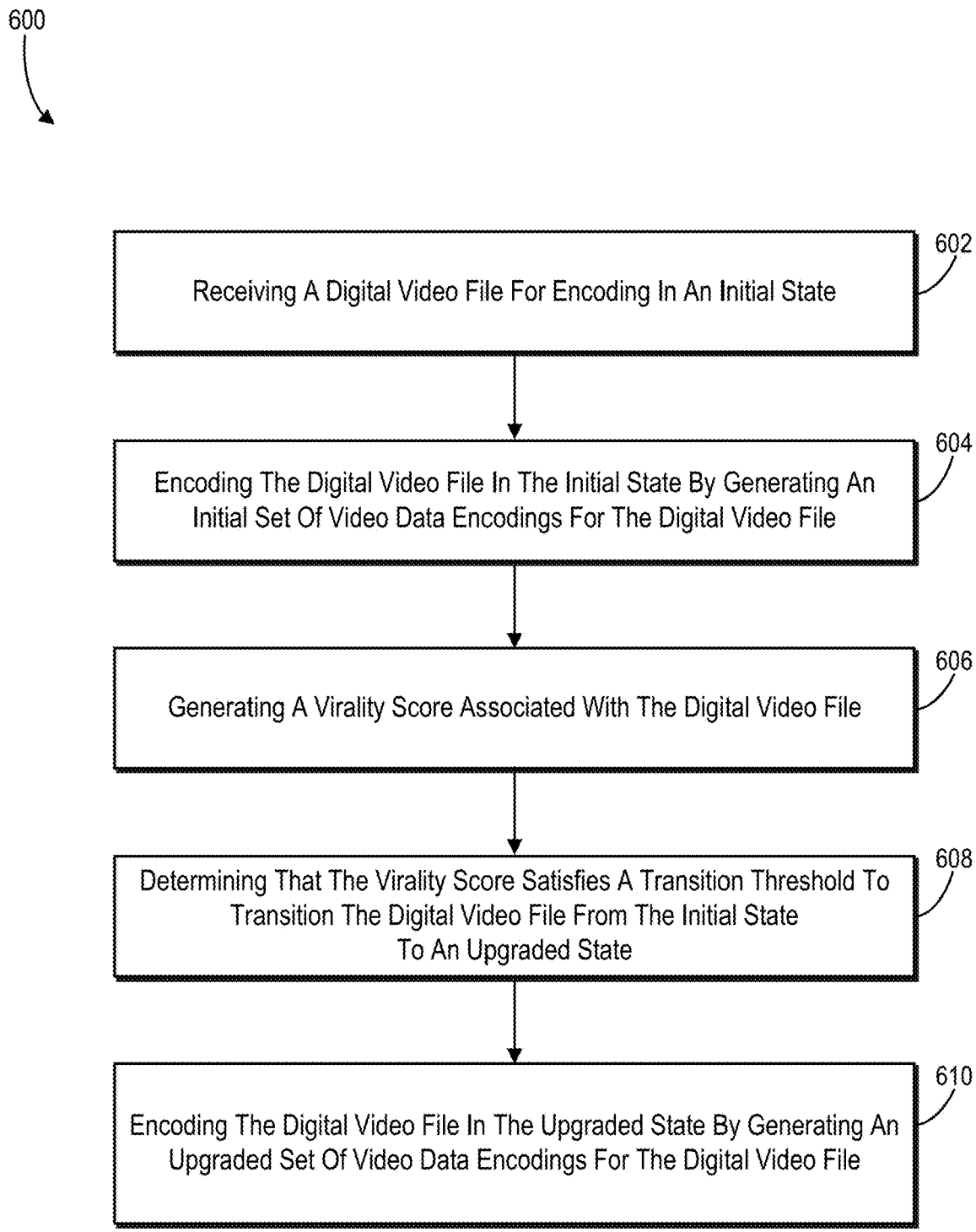
FIG. 6 illustrates a flowchart of a series of acts for identifying a digital video file upon upload and transitioning the digital video file between encoding states of video data encodings in accordance with one or more embodiments.

FIGS. 1-5, the corresponding text, and the examples provide several different systems, methods, techniques, components, and/or devices of the video-data-encoding system 104 in accordance with one or more embodiments. In addition to the above description, one or more embodiments can also be described in terms of flowcharts including acts for accomplishing a particular result. For example, FIG. 6 illustrates a flowchart of a series of acts 600 for generating an upgraded set of video data encodings in accordance with one or more embodiments. The video-data-encoding system 104 may perform one or more acts of the series of acts 600 in addition to or alternatively to one or more acts described in conjunction with other figures. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown, the series of acts 600 includes an act 602 of receiving a digital video file for encoding in an initial state. For example, the act 602 can include receiving, from a computing device associated with an uploading user of a social networking system, a digital video file for encoding in an initial state. The series of acts 600 further includes an act 604 of encoding the digital video file in the initial state by generating an initial set of video data encodings for the digital video file. For example, the act 604 can include, based on receiving the digital video file, encoding the digital video file in the initial state by generating an initial set of video data encodings for the digital video file.

The series of acts 600 further includes an act 606 of generating a virality score associated with the digital video file. For example, in some embodiments, the act 606 includes generating a virality score associated with the digital video file based on actions by other users of the social networking system with respect to the uploading user or the digital video file. In some embodiments, generating the virality score associated with the digital video file comprises generating a priority ranking for the digital video file according to a number of users of the social networking system subscribed to receive content from the uploading user. Additionally or alternatively, generating the virality score associated with the digital video file comprises determining a number of views of the digital video file by users of the social networking system. Additionally or alternatively, generating the virality score associated with the digital video file comprises generating a predicted watchtime of the digital video file.

The series of acts 600 further includes an act 608 of determining that the virality score satisfies a transition threshold to transition the digital video file from the initial state to an upgraded state. In some embodiments, determining that the virality score satisfies the transition threshold comprises comparing the priority ranking for the digital video file to a dynamic transition threshold based on available computing resources. Additionally or alternatively, determining that the virality score satisfies the transition threshold comprises determining that the number of views of the digital video file exceeds or equals a threshold view count. Additionally or alternatively, determining that the virality score satisfies the transition threshold comprises determining that the predicted watchtime of the digital video file exceeds or equals a threshold predicted watchtime.

The series of acts 600 further includes an act 610 of encoding the digital video file in the upgraded state by generating an upgraded set of video data encodings for the digital video file. For example, the act 610 can include, based on determining the virality score satisfies the transition threshold, encoding the digital video file in the upgraded state by generating an upgraded set of video data encodings for the digital video file.

It is understood that the outlined acts in the series of acts 600 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 6, act(s) in the series of acts 600 may include an act of: determining a threshold time period has elapsed since uploading the digital video file; and based on determining the threshold time period has elapsed, removing one or more of the upgraded set of video data encodings for the digital video file to transition the digital video file from the upgraded state to a maintenance state.

As another example of an additional act not shown in FIG. 6, act(s) in the series of acts 600 may include an act of: generating an updated virality score associated with the digital video file based on subsequent actions by the other users of the social networking system with respect to the uploading user or the digital video file; determining that the updated virality score satisfies an updated transition threshold to transition the digital video file from the maintenance state to the upgraded state; and based on determining the updated virality score satisfies the updated transition threshold, encoding the digital video file in the upgraded state by generating an additional upgraded set of video data encodings for the digital video file.

In yet another example of an additional act not shown in FIG. 6, act(s) in the series of acts 600 may include an act of: receiving, from an additional computing device associated with an additional uploading user of the social networking system, an additional digital video file for encoding in the initial state; based on receiving the additional digital video file, encoding the additional digital video file in the initial state by generating an initial set of video data encodings for the additional digital video file; generating an additional virality score associated with the additional digital video file based on actions by various users of the social networking system with respect to the additional uploading user or the additional digital video file; determining that the additional virality score fails to satisfy the transition threshold (or a new transition threshold) to transition the additional digital video file from the initial state to the upgraded state; and based on determining the additional virality score fails to satisfy the transition threshold, removing one or more of the initial set of video data encodings for the additional digital video file to transition the additional digital video file from the initial state to a maintenance state.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
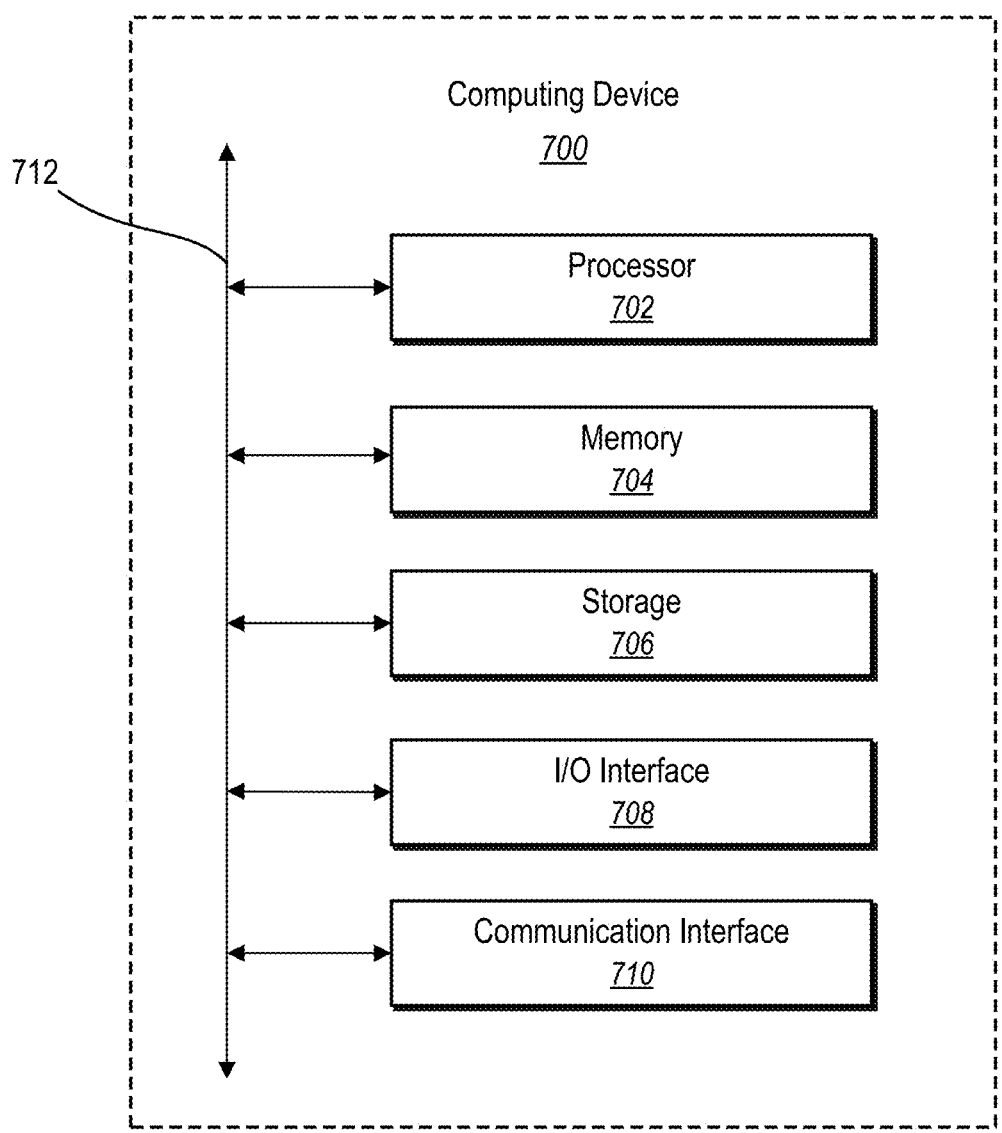
FIG. 7 illustrates a block diagram of an example computing device for implementing one or more embodiments of the present disclosure.

FIG. 7 illustrates a block diagram of an example computing device 700 that may be configured to perform one or more of the processes described above in accordance with one or more embodiments. One will appreciate that one or more computing devices, such as the computing device 700 may represent the computing devices described above (e.g., the computing device 500, the client device 406, the server(s) 102, and/or the client devices 108*a*-108*n*). In one or more embodiments, the computing device 700 may be a mobile device (e.g., a mobile telephone, a smartphone, a PDA, a tablet, a laptop, a camera, a tracker, a watch, a wearable device). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments.

Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of the computing device 700 to each other.

As mentioned above, the video-data-encoding system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 8:
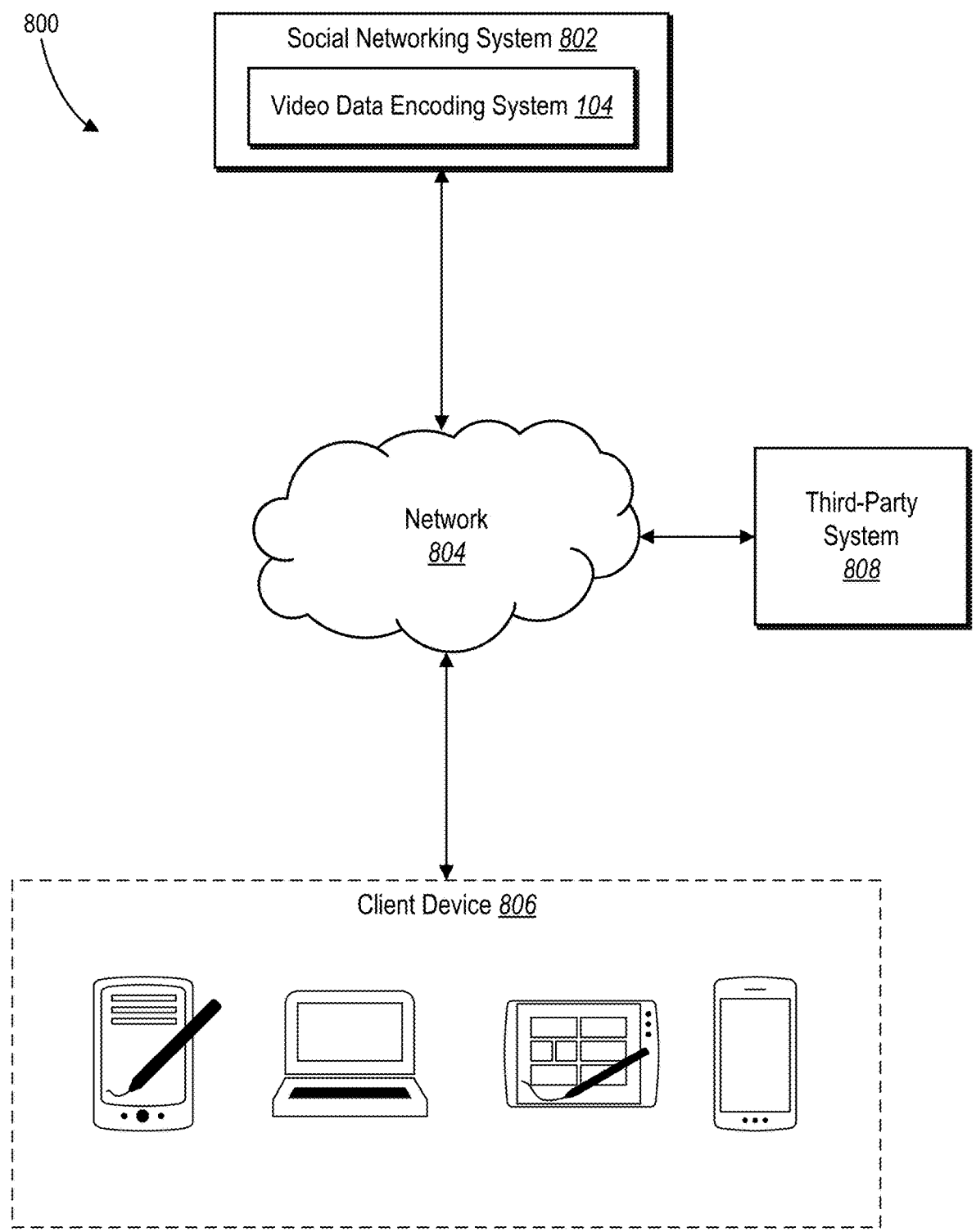
FIG. 8 illustrates a network environment of a social networking system according to one or more embodiments.

FIG. 8 illustrates an example network environment 800 of a social networking system implementing the video-data-encoding system 104 in accordance with one or more embodiments. The network environment 800 includes a client device 806, a social networking system 802, and a third-party system 808 connected to each other by a network 804. Although FIG. 8 illustrates a particular arrangement of client device 806, the social networking system 802, the third-party system 808, and the network 804, this disclosure contemplates any suitable arrangement and number of client device 806, the social networking system 802, the third-party system 808, and the network 804.

Links may connect the client device 806, the social networking system 802, and the third-party system 808 to the network 804 or to each other. Links need not necessarily be the same throughout network environment 800. One or more first links may differ in one or more respects from one or more second links.

In some embodiments, the client device 806 may be an electronic device including hardware, software, or embedded logic components or a combination of two or more such components and capable of carrying out the appropriate functionalities implemented or supported by the client device 806. As an example, a client device 806 may include any of the computing devices discussed above in relation to FIG. 8. The client device 806 may enable a network user at the client device 806 to access the network 804. The client device 806 may enable its user to communicate with other users at other client devices or systems.

In some embodiments, the client device 806 may include a web browser, such as and may have one or more add-ons, plug-ins, or other extensions. The client device 806 may render a web page based on the HTML files from the server for presentation to the user.

In some embodiments, the social networking system 802 may be a network-addressable computing system that can host an online social network. In addition, the social networking system 802 may generate, store, receive, and send social-networking data, such as, for example, user-profile data, concept-profile data, the social-graph information, or other suitable data related to the online social network. The social networking system 802 may be accessed by the other components of the network environment 800 either directly or via the network 804.

As shown, the social networking system 802 includes the video-data-encoding system 104, which is described above. The video-data-encoding system 104 may be implemented on a unitary server or a distributed server spanning multiple computers or multiple datacenters. These servers may be of various types, such as, for example and without limitation, web server, news server, mail server, message server, advertising server, file server, application server, exchange server, database server, proxy server, etc., or any combination thereof.

In some embodiments, the social networking system 802 may include one or more data stores. Data stores may be used to store various types of information. In some embodiments, the information stored in data stores may be organized according to specific data structures. Particular embodiments may provide interfaces that enable the client device 806, the social networking system 802, or the third-party system 808 to manage, retrieve, modify, add, or delete, the information stored in data stores.

In some embodiments, the social networking system 802 may store one or more social graph, described below. In one or more embodiments, the social networking system 802 may provide users with the ability to take actions on various types of items or objects, supported by social networking system 802. As an example, the items and objects may include groups or social networks to which users of the social networking system 802 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 802 or by an external system of the third-party system 808, which is separate from the social networking system 802 and coupled to the social networking system 802 via the network 804.

The social networking system 802 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 802. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 802. A privacy setting of a user determines how particular information associated with a user can be shared. The authorization server may allow users to opt in to or opt out of having their actions logged by the social networking system 802 or shared with other systems (e.g., the third-party system 808), such as, for example, by setting appropriate privacy settings.

In some embodiments, the third-party system 808 may include one or more types of servers, one or more data stores, one or more interfaces, including but not limited to APIs, one or more web services, one or more content sources, one or more networks, or any other suitable components. The third-party system 808 may be operated by a different entity from an entity operating the social networking system 802 even if, in some embodiments, the social networking system 802 and the third-party systems 808 operate in conjunction with each other. In this sense, the social networking system 802 may provide a platform, or backbone, which other systems, such as the third-party systems 808, may use to provide social-networking services and functionality to users across the Internet.

In some embodiments, a third-party system 808 may include a third-party content object provider. A third-party content object provider may include one or more sources of content objects, which may be communicated to the client device 806. As an example, content objects may include information regarding things or activities of interest to the user. As another example, content objects may include incentive content objects.

Figure 9:
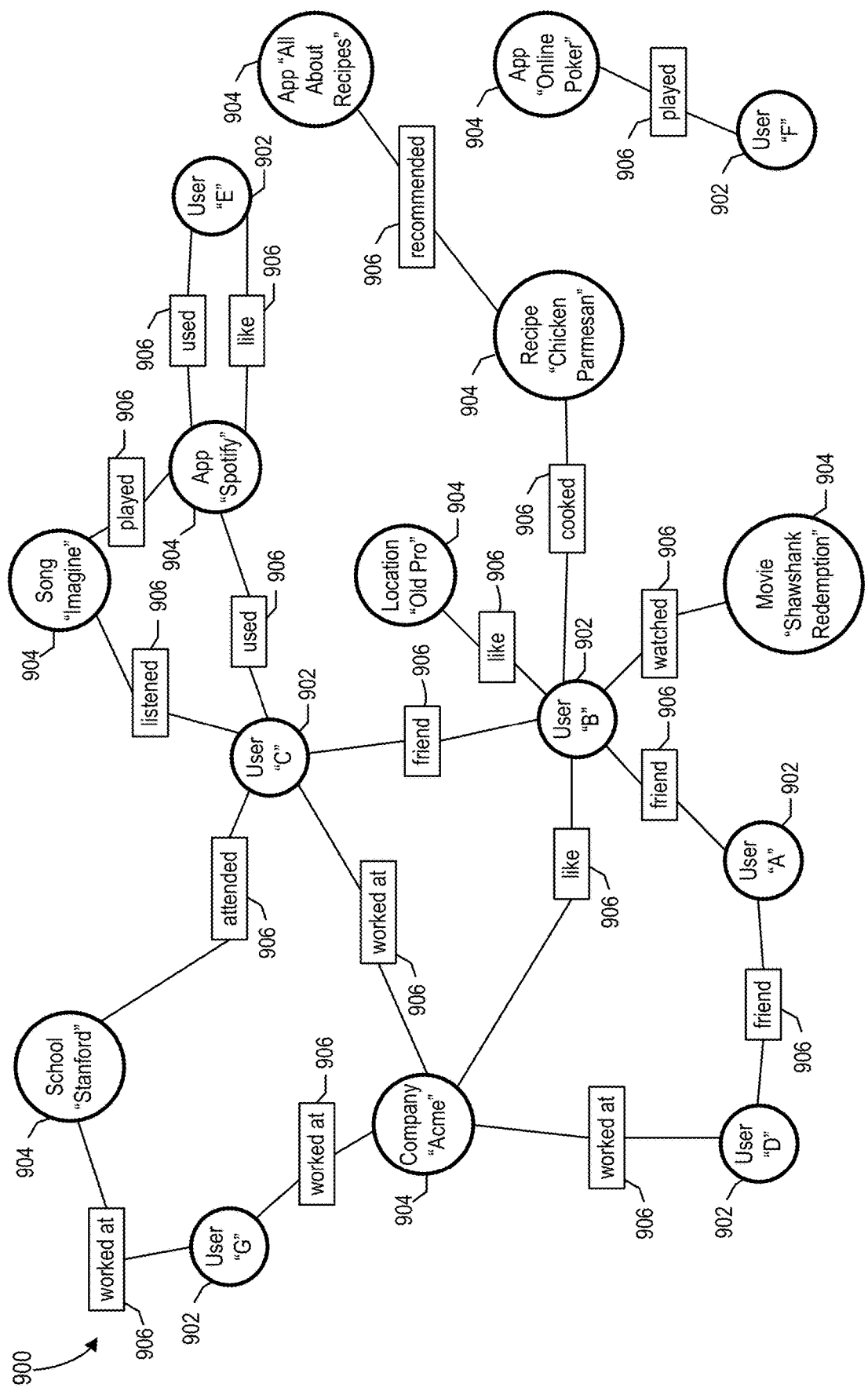
FIG. 9 illustrates an example social graph for a social networking system in accordance with one or more embodiments.

FIG. 9 illustrates an example social graph 900 for the social networking system 802 in accordance with one or more embodiments. In some embodiments, the social networking system 802 may store one or more social graphs 900 in one or more data stores. In some embodiments, the social graph 900 may include multiple nodes—which may include multiple user nodes or multiple concept nodes—and multiple edges 906 connecting the nodes. The social graph 900 illustrated in FIG. 9 is shown, for didactic purposes, in a two-dimensional visual map representation.

In some embodiments, a user node 902 may correspond to a user of social networking system 802. When a user registers for an account with social networking system 802, the social networking system 802 may create a user node 902 corresponding to the user and store the user node 902 in one or more data stores. Users and user nodes described herein may, where appropriate, refer to registered users and user nodes associated with registered users.

In some embodiments, a concept node 904 may correspond to a concept. As an example, a concept may correspond to a place, a website, an entity, a resource, etc. A concept may be located within social networking system 802 or on an external server. A concept node 904 may be associated with information of a concept provided by a user or information gathered by various systems, including the social networking system 802.

In some embodiments, a node in social graph 900 may represent or be represented by an online profile page. Profile pages may be hosted by or accessible to social networking system 802. Profile pages may be viewable by all or a selected subset of other users. As an example, a user node 902 may have a corresponding user-profile page where the corresponding user may add content, make declarations, or otherwise express him or herself. As another example, a concept node 904 may have a corresponding concept-profile page in which one or more users may add content, make declarations, or express themselves, particularly in relation to the concept corresponding to concept node 904.

As an example, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships.

In some embodiments, a pair of nodes in social graph 900 may be connected to each other by one or more edges 906. An edge 906 connecting a pair of nodes may represent a relationship between the pair of nodes. In some embodiments, an edge 906 may include or represent one or more data objects or attributes corresponding to the relationship between a pair of nodes. As an example, a first user may indicate that a second user is a "friend" of the first user. In response to this indication, the social networking system 802 may send a "friend request" to the second user. If the second user confirms the "friend request," the social networking system 802 may create an edge 906 connecting the first user's user node 902 to the second user's user node 902 in social graph 900 and store edge 906 as social-graph information in one or more of data stores.

In some embodiments, an edge 906 between a user node 902 and a concept node 904 may represent a particular action or activity performed by a user associated the with the user node 902 toward a concept associated with the concept node 904. As an example, as illustrated in FIG. 9, a user may "like," "attended," "played," "listened," "cooked," "worked at," or "watched" a concept, each of which may correspond to an edge type or subtype.

In some embodiments, the social networking system 802, the client device 806, or the third-party system 808 may access the social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition, or as an alternative, an advertisement may be one or more sponsored stories (e.g., a news feed or ticker item on the social networking system 802).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 802 who has taken an action associated with the subject matter of the advertisement.

In some embodiments, the social networking system 802 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity.

In some embodiments, the social networking system 802 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 802 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 802 may determine coefficients using machine-learning algorithms trained on historical actions and past user responses, or data farmed from users by exposing them to various options and measuring responses.

In some embodiments, the social networking system 802 may calculate a coefficient based on a user's actions. The social networking system 802 may monitor such actions on the online social network, on the third-party system 808, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 802 may calculate a coefficient based on the user's actions with particular types of content. The content may be associated with the online social network, the third-party system 808, or another suitable system. The social networking system 802 may analyze a user's actions to determine whether one or more of the actions indicate an affinity for subject matter, content, other users, and so forth.

In some embodiments, the social networking system 802 may calculate a coefficient based on the type of relationship between particular objects. Referencing the social graph 900, the social networking system 802 may analyze the number and/or type of edges 906 connecting particular user nodes and concept nodes 904 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 900.

In some embodiments, the social networking system 802 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 806 of the user). A first user may be more interested in other users or concepts that are closer to the first user. As an example, if a user is one mile from an airport and two miles from a gas station, the social networking system 802 may determine that the user has a higher coefficient for the airport than the gas station based on the proximity of the airport to the user.

In some embodiments, the social networking system 802 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 802 may provide information that is relevant to user's interests and current circumstances, increasing the likelihood that they will find such information of interest.

In some embodiments, the social networking system 802 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 10, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 802 may send a request to the data store for the object. The request may identify the user associated with the request and may be sent to the user (or the client device 806 of the user) if the authorization server determines that the user is authorized to access the object based on the privacy settings associated with the object, but not otherwise.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a system to:
- receive, from a computing device associated with an uploading user of a social networking system, a digital video file for encoding in an initial state corresponding to an initial quality level;
- based on receiving the digital video file, encode the digital video file in the initial state by generating an initial set of video data encodings for the digital video file;
- generate a virality score associated with the digital video file based on actions by other users of the social networking system with respect to the uploading user or the digital video file;
- determine that the virality score satisfies a transition threshold to transition the digital video file from the initial state to an upgraded state corresponding to a higher quality level; and
- based on determining the virality score satisfies the transition threshold, encode the digital video file in the upgraded state by generating an upgraded set of video data encodings for the digital video file corresponding to the higher quality level.

2. The non-transitory computer-readable medium of claim 1, further comprising instructions that, when executed by the at least one processor, cause the system to:
- generate the virality score associated with the digital video file by generating a priority ranking for the digital video file according to a number of users of the social networking system subscribed to receive content from the uploading user; and
- determine that the virality score satisfies the transition threshold by comparing the priority ranking for the digital video file to a dynamic transition threshold based on available computing resources.

3. The non-transitory computer-readable medium of claim 1, further comprising instructions that, when executed by the at least one processor, cause the system to:
- generate the virality score associated with the digital video file by determining a number of views of the digital video file by users of the social networking system; and
- determine that the virality score satisfies the transition threshold by determining that the number of views of the digital video file exceeds or equals a threshold view count.

4. The non-transitory computer-readable medium of claim 1, further comprising instructions that, when executed by the at least one processor, cause the system to:
- generate the virality score associated with the digital video file by generating a predicted watchtime of the digital video file; and
- determine that the virality score satisfies the transition threshold by determining that the predicted watchtime of the digital video file exceeds or equals a threshold predicted watchtime.

5. The non-transitory computer-readable medium of claim 1, further comprising instructions that, when executed by the at least one processor, cause the system to:
- determine a threshold time period has elapsed since uploading the digital video file; and
- based on determining the threshold time period has elapsed, remove one or more of the upgraded set of video data encodings for the digital video file to transition the digital video file from the upgraded state to a maintenance state.

6. The non-transitory computer-readable medium of claim 5, further comprising instructions that, when executed by the at least one processor, cause the system to:
- generate an updated virality score associated with the digital video file based on subsequent actions by the other users of the social networking system with respect to the uploading user or the digital video file;
- determine that the updated virality score satisfies an updated transition threshold to transition the digital video file from the maintenance state to the upgraded state; and
- based on determining the updated virality score satisfies the updated transition threshold, encode the digital video file in the upgraded state by generating an additional upgraded set of video data encodings for the digital video file.

7. The non-transitory computer-readable medium of claim 1, further comprising instructions that, when executed by the at least one processor, cause the system to:
- receive, from an additional computing device associated with an additional uploading user of the social networking system, an additional digital video file for encoding in the initial state;
- based on receiving the additional digital video file, encode the additional digital video file in the initial state by generating an initial set of video data encodings for the additional digital video file;
- generate an additional virality score associated with the additional digital video file based on actions by various users of the social networking system with respect to the additional uploading user or the additional digital video file;
- determine that the additional virality score fails to satisfy a new transition threshold to transition the additional digital video file from the initial state to the upgraded state; and
- based on determining the additional virality score fails to satisfy the new transition threshold, remove one or more of the initial set of video data encodings for the additional digital video file to transition the additional digital video file from the initial state to a maintenance state.

8. A system comprising:
at least one processor; and
at least one non-transitory computer-readable storage medium storing instructions that, when executed by the at least one processor, cause the system to:
- receive, from a computing device associated with an uploading user of a social networking system, a digital video file for encoding in an initial state corresponding to an initial quality level;
- based on receiving the digital video file, encode the digital video file in the initial state by generating an initial set of video data encodings for the digital video file;
- generate a virality score associated with the digital video file based on actions by other users of the social networking system with respect to the uploading user or the digital video file;

determine that the virality score satisfies a transition threshold to transition the digital video file from the initial state to an upgraded state corresponding to a higher quality level; and based on determining the virality score satisfies the transition threshold, encode the digital video file in the upgraded state by generating an upgraded set of video data encodings for the digital video file corresponding to the higher quality level.

9. The system of claim 8, further comprising instructions that, when executed by the at least one processor, cause the system to:

generate the virality score associated with the digital video file by generating a priority ranking for the digital video file according to a number of users of the social networking system subscribed to receive content from the uploading user; and determine that the virality score satisfies the transition threshold by comparing the priority ranking for the digital video file to a dynamic transition threshold based on available computing resources.

10. The system of claim 8, further comprising instructions that, when executed by the at least one processor, cause the system to:

generate the virality score associated with the digital video file by determining a number of views of the digital video file by users of the social networking system; and determine that the virality score satisfies the transition threshold by determining that the number of views of the digital video file exceeds or equals a threshold view count.

11. The system of claim 8, further comprising instructions that, when executed by the at least one processor, cause the system to:

generate the virality score associated with the digital video file by generating a predicted watchtime of the digital video file; and determine that the virality score satisfies the transition threshold by determining that the predicted watchtime of the digital video file exceeds or equals a threshold predicted watchtime.

12. The system of claim 8, further comprising instructions that, when executed by the at least one processor, cause the system to:

determine a threshold time period has elapsed since uploading the digital video file; and based on determining the threshold time period has elapsed, remove one or more of the upgraded set of video data encodings for the digital video file to transition the digital video file from the upgraded state to a maintenance state.

13. The system of claim 12, further comprising instructions that, when executed by the at least one processor, cause the system to:

generate an updated virality score associated with the digital video file based on subsequent actions by the other users of the social networking system with respect to the uploading user or the digital video file;

determine that the updated virality score satisfies an updated transition threshold to transition the digital video file from the maintenance state to the upgraded state; and based on determining the updated virality score satisfies the updated transition threshold, encode the digital video file in the upgraded state by generating an additional upgraded set of video data encodings for the digital video file.

14. The system of claim 8, further comprising instructions that, when executed by the at least one processor, cause the system to:

receive, from an additional computing device associated with an additional uploading user of the social networking system, an additional digital video file for encoding in the initial state;

based on receiving the additional digital video file, encode the additional digital video file in the initial state by generating an initial set of video data encodings for the additional digital video file;

generate an additional virality score associated with the additional digital video file based on actions by various users of the social networking system with respect to the additional uploading user or the additional digital video file;

determine that the additional virality score fails to satisfy the transition threshold to transition the additional digital video file from the initial state to the upgraded state; and based on determining the additional virality score fails to satisfy the transition threshold, remove one or more of the initial set of video data encodings for the additional digital video file to transition the additional digital video file from the initial state to a maintenance state.

15. A computer-implemented method comprising: receiving, from a computing device associated with an uploading user of a social networking system, a digital video file for encoding in an initial state corresponding to an initial quality level; based on receiving the digital video file, encoding the digital video file in the initial state by generating an initial set of video data encodings for the digital video file; generating a virality score associated with the digital video file based on actions by other users of the social networking system with respect to the uploading user or the digital video file; determining that the virality score satisfies a transition threshold to transition the digital video file from the initial state to an upgraded state corresponding to a higher quality level; and based on determining the virality score satisfies the transition threshold, encoding the digital video file in the upgraded state by generating an upgraded set of video data encodings for the digital video file corresponding to the higher quality level.

16. The computer-implemented method of claim 15, wherein:

generating the virality score associated with the digital video file comprises generating a priority ranking for the digital video file according to a number of users of the social networking system subscribed to receive content from the uploading user; and determining that the virality score satisfies the transition threshold comprises comparing the priority ranking for the digital video file to a dynamic transition threshold based on available computing resources.

17. The computer-implemented method of claim 15, wherein:

generating the virality score associated with the digital video file comprises determining a number of views of the digital video file by users of the social networking system; and determining that the virality score satisfies the transition threshold comprises determining that the number of views of the digital video file exceeds or equals a threshold view count.

18. The computer-implemented method of claim 15, wherein:
- generating the virality score associated with the digital video file comprises generating a predicted watchtime of the digital video file; and
- determining that the virality score satisfies the transition threshold comprises determining that the predicted watchtime of the digital video file exceeds or equals a threshold predicted watchtime.

19. The computer-implemented method of claim 15, further comprising:
- determining a threshold time period has elapsed since uploading the digital video file; and
- based on determining the threshold time period has elapsed, removing one or more of the upgraded set of video data encodings for the digital video file to transition the digital video file from the upgraded state to a maintenance state.

20. The computer-implemented method of claim 19, further comprising:
- generating an updated virality score associated with the digital video file based on subsequent actions by the other users of the social networking system with respect to the uploading user or the digital video file;
- determining that the updated virality score satisfies an updated transition threshold to transition the digital video file from the maintenance state to the upgraded state; and
- based on determining the updated virality score satisfies the updated transition threshold, encoding the digital video file in the upgraded state by generating an additional upgraded set of video data encodings for the digital video file.

* * * * *